(12) United States Patent
Kim et al.

(10) Patent No.: US 7,573,966 B2
(45) Date of Patent: Aug. 11, 2009

(54) ADAPTIVE NOISE FILTERING AND EQUALIZATION FOR OPTIMAL HIGH SPEED MULTILEVEL SIGNAL DECODING

(75) Inventors: Andrew Joo Kim, Atlanta, GA (US); Vincent Mark Hietala, Albuquerque, NM (US); Sanjay Bajekal, Marietta, GA (US)

(73) Assignee: Quellan, Inc., Atlanta, GA (US)

( * ) Notice: Subject to any disclaimer, the term of this patent is extended or adjusted under 35 U.S.C. 154(b) by 271 days.

(21) Appl. No.: 11/358,901

(22) Filed: Feb. 21, 2006

(65) Prior Publication Data
US 2006/0239390 A1 Oct. 26, 2006

Related U.S. Application Data

(63) Continuation of application No. 10/620,477, filed on Jul. 15, 2003, now Pat. No. 7,035,361.

(51) Int. Cl.
*H04B 1/10* (2006.01)
(52) U.S. Cl. .................... 375/350; 375/348; 375/349
(58) Field of Classification Search ............... 375/350, 375/355, 357, 358, 344, 316, 317, 219; 398/202; 370/201, 286
See application file for complete search history.

(56) References Cited

U.S. PATENT DOCUMENTS

| | | | |
|---|---|---|---|
| 2,632,058 A | 3/1953 | Gray | |
| 3,445,771 A | 5/1969 | Clapham et al. | |
| 3,571,725 A | 3/1971 | Kaneko et al. | |
| 3,599,122 A | 8/1971 | Leuthold | |
| 3,609,682 A * | 9/1971 | Mitchell | ............. 714/760 |
| 3,633,108 A | 1/1972 | Kneuer | ............. 325/323 |

(Continued)

FOREIGN PATENT DOCUMENTS

EP      0 527 966 B1      9/1994

(Continued)

OTHER PUBLICATIONS

Weger, P.; Schultes, G.; Treitinger, L.; Bertagnolli, E.; Ehinger, K.; "Gilbert multiplier as an active mixer with conversion gain bandwidth of up to 17 GHz" Electronics Letters, vol. 27, issue 28, 1991, pp. 570-571.*

(Continued)

*Primary Examiner*—Chieh M Fan
*Assistant Examiner*—Qutbuddin Ghulamali
(74) *Attorney, Agent, or Firm*—King & Spalding LLP

(57) ABSTRACT

A Signal Conditioning Filter (SCF) and a Signal Integrity Unit (SIU) address the coupled problem of equalization and noise filtering in order to improve signal fidelity for decoding. Specifically, a received signal can be filtered in a manner to optimize the signal fidelity even in the presence of both significant (large magnitudes of) ISI and noise. The present invention can provide an adaptive method that continuously monitors a signal fidelity measure. Monitoring the fidelity of a multilevel signal can be performed by external means such as by the SIU. A received signal $y(t)$ can be "conditioned" by application of a filter with an electronically adjustable impulse response $g(t)$. A resulting output $z(t)$ can then be interrogated to characterize the quality of the conditioned signal. This fidelity measure $q(t)$ can be used to adjust the filter response to maximize the fidelity measure of the conditioned signal.

10 Claims, 14 Drawing Sheets

U.S. PATENT DOCUMENTS

| | | | |
|---|---|---|---|
| 3,714,437 A | 1/1973 | Kinsel | |
| 3,806,915 A | 4/1974 | Higgins et al. | |
| 3,977,795 A | 8/1976 | Buschmann | |
| 4,201,909 A | 5/1980 | Dogliotti et al. | 455/608 |
| 4,287,756 A | 9/1981 | Gallagher | |
| 4,288,872 A | 9/1981 | Tamburelli | |
| 4,349,914 A | 9/1982 | Evans | |
| 4,363,127 A | 12/1982 | Evans et al. | |
| 4,386,339 A | 5/1983 | Henry et al. | |
| 4,387,461 A | 6/1983 | Evans | |
| 4,393,499 A | 7/1983 | Evans | |
| 4,410,878 A | 10/1983 | Stach | 340/347 DD |
| 4,464,771 A | 8/1984 | Sorensen | |
| 4,470,126 A | 9/1984 | Haque | |
| 4,475,227 A | 10/1984 | Belfield | 381/30 |
| 4,479,266 A | 10/1984 | Eumurian et al. | |
| 4,521,883 A | 6/1985 | Roché | |
| 4,580,263 A | 4/1986 | Watanabe et al. | |
| 4,584,720 A | 4/1986 | Garrett | |
| 4,618,941 A | 10/1986 | Linder et al. | |
| 4,646,173 A | 2/1987 | Kammeyer et al. | |
| 4,651,026 A | 3/1987 | Serfaty et al. | |
| 4,751,497 A | 6/1988 | Torii | |
| 4,830,493 A | 5/1989 | Giebeler | |
| 4,847,521 A | 7/1989 | Huignard et al. | |
| 4,864,590 A | 9/1989 | Arnon et al. | |
| 4,873,700 A | 10/1989 | Wong | |
| 4,912,726 A | 3/1990 | Iwamatsu et al. | |
| 4,942,593 A | 7/1990 | Whiteside et al. | |
| 4,953,041 A | 8/1990 | Huber | 360/46 |
| 4,959,535 A | 9/1990 | Garrett | |
| 4,978,957 A | 12/1990 | Hotta et al. | |
| 5,007,106 A | 4/1991 | Kahn et al. | |
| 5,008,957 A | 4/1991 | Klyono | |
| 5,012,475 A | 4/1991 | Campbell | |
| 5,067,126 A | 11/1991 | Moore | |
| 5,072,221 A | 12/1991 | Schmidt | |
| 5,111,065 A | 5/1992 | Roberge | |
| 5,113,278 A | 5/1992 | Degura et al. | |
| 5,115,450 A | 5/1992 | Arcuri | |
| 5,121,411 A | 6/1992 | Fluharty | |
| 5,128,790 A | 7/1992 | Heidemann et al. | |
| 5,132,639 A | 7/1992 | Blauvelt et al. | |
| 5,151,698 A | 9/1992 | Pophillat | |
| 5,155,742 A * | 10/1992 | Ariyavisitakul et al. | 375/231 |
| 5,181,034 A | 1/1993 | Takakura et al. | |
| 5,181,136 A | 1/1993 | Kavehrad et al. | |
| 5,184,131 A | 2/1993 | Ikeda | |
| 5,208,833 A | 5/1993 | Erhart et al. | |
| 5,222,103 A | 6/1993 | Gross | |
| 5,223,834 A | 6/1993 | Wang et al. | |
| 5,225,798 A | 7/1993 | Hunsinger et al. | |
| 5,237,590 A | 8/1993 | Kazawa et al. | |
| 5,243,613 A | 9/1993 | Gysel et al. | |
| 5,252,930 A | 10/1993 | Blauvelt | |
| 5,282,072 A | 1/1994 | Nazarathy et al. | |
| 5,283,679 A | 2/1994 | Wedding | |
| 5,291,031 A | 3/1994 | MacDonald et al. | |
| 5,293,406 A | 3/1994 | Suzuki | |
| 5,300,930 A | 4/1994 | Burger et al. | |
| 5,321,543 A | 6/1994 | Huber | |
| 5,321,710 A | 6/1994 | Cornish et al. | |
| 5,327,279 A | 7/1994 | Farina et al. | |
| 5,343,322 A | 8/1994 | Pirio et al. | |
| 5,351,148 A | 9/1994 | Maeda et al. | |
| 5,355,240 A | 10/1994 | Prigent et al. | |
| 5,361,156 A | 11/1994 | Pidgeon | |
| 5,371,625 A | 12/1994 | Wedding et al. | |
| 5,373,384 A | 12/1994 | Hebert | |
| 5,376,786 A | 12/1994 | MacDonald | |
| 5,382,955 A | 1/1995 | Knierim | |
| 5,387,887 A | 2/1995 | Zimmerman et al. | |
| 5,408,485 A | 4/1995 | Ries | |
| 5,413,047 A | 5/1995 | Evans et al. | |
| 5,416,628 A | 5/1995 | Betti et al. | |
| 5,418,637 A | 5/1995 | Kuo | |
| 5,424,680 A | 6/1995 | Nazarathy et al. | |
| 5,428,643 A | 6/1995 | Razzell | |
| 5,428,831 A * | 6/1995 | Monzello et al. | 455/296 |
| 5,436,752 A | 7/1995 | Wedding | |
| 5,436,756 A | 7/1995 | Knox et al. | |
| 5,444,864 A | 8/1995 | Smith | 455/84 |
| 5,450,044 A | 9/1995 | Hulick | |
| 5,481,389 A | 1/1996 | Pidgeon et al. | |
| 5,481,568 A | 1/1996 | Yada | |
| 5,483,552 A | 1/1996 | Shimazaki et al. | 375/233 |
| 5,504,633 A | 4/1996 | Van Den Enden | |
| 5,510,919 A | 4/1996 | Wedding | |
| 5,515,196 A | 5/1996 | Kitajima et al. | |
| 5,528,710 A | 6/1996 | Burton et al. | |
| 5,541,955 A | 7/1996 | Jacobsmeyer | 375/222 |
| 5,548,253 A | 8/1996 | Durrant | |
| 5,557,439 A | 9/1996 | Alexander et al. | 359/130 |
| 5,574,743 A | 11/1996 | van der Poel et al. | |
| 5,574,978 A | 11/1996 | Talwar et al. | |
| 5,589,786 A | 12/1996 | Bella et al. | |
| 5,604,724 A | 2/1997 | Shiokawa | |
| 5,606,734 A | 2/1997 | Bahu | 455/303 |
| 5,612,653 A | 3/1997 | Dodds et al. | |
| 5,617,135 A | 4/1997 | Noda et al. | 348/12 |
| 5,621,764 A | 4/1997 | Ushirokawa et al. | |
| 5,625,360 A | 4/1997 | Garrity et al. | |
| 5,625,722 A | 4/1997 | Froberg et al. | |
| 5,640,417 A * | 6/1997 | Barabash et al. | 375/222 |
| 5,644,325 A | 7/1997 | King et al. | |
| 5,648,987 A | 7/1997 | Yang et al. | 375/232 |
| 5,670,871 A | 9/1997 | Man et al. | |
| 5,675,600 A | 10/1997 | Yamamoto | |
| 5,678,198 A | 10/1997 | Lemson | |
| 5,689,356 A | 11/1997 | Rainal | |
| 5,691,978 A | 11/1997 | Kenworthy | 370/278 |
| 5,692,011 A * | 11/1997 | Nobakht et al. | 375/233 |
| 5,699,022 A | 12/1997 | Tovar | 333/18 |
| 5,706,008 A | 1/1998 | Huntley, Jr. et al. | |
| 5,721,315 A | 2/1998 | Evans et al. | |
| 5,723,176 A | 3/1998 | Keyworth et al. | |
| 5,751,726 A | 5/1998 | Kim | |
| 5,754,681 A | 5/1998 | Watanabe et al. | |
| 5,757,763 A | 5/1998 | Green et al. | |
| 5,761,243 A | 6/1998 | Russell et al. | |
| 5,764,542 A | 6/1998 | Gaudette et al. | |
| 5,774,505 A | 6/1998 | Baugh | 375/348 |
| 5,783,630 A | 7/1998 | Evans et al. | |
| 5,784,032 A | 7/1998 | Johnston et al. | |
| 5,790,595 A * | 8/1998 | Benthin et al. | 375/224 |
| 5,798,854 A | 8/1998 | Blauvelt et al. | |
| 5,801,657 A | 9/1998 | Fowler et al. | |
| 5,802,089 A | 9/1998 | Link | |
| 5,812,578 A | 9/1998 | Schemmann et al. | |
| 5,825,211 A | 10/1998 | Smith et al. | |
| 5,825,257 A | 10/1998 | Klymyshyn et al. | |
| 5,825,825 A | 10/1998 | Altmann et al. | |
| 5,828,329 A | 10/1998 | Burns | |
| 5,835,848 A | 11/1998 | Bi et al. | 455/24 |
| 5,839,105 A | 11/1998 | Ostendorf et al. | |
| 5,841,841 A | 11/1998 | Dodds et al. | |
| 5,844,436 A | 12/1998 | Altmann | |
| 5,848,139 A | 12/1998 | Grover | |
| 5,850,409 A | 12/1998 | Link | |
| 5,850,505 A | 12/1998 | Grover et al. | |
| 5,852,389 A | 12/1998 | Kumar et al. | |
| 5,859,862 A | 1/1999 | Hikasa et al. | |
| 5,861,966 A | 1/1999 | Ortel | |
| 5,872,468 A | 2/1999 | Dyke | |

| | | | | | | |
|---|---|---|---|---|---|---|
| 5,878,390 | A | 3/1999 | Kawai et al. | 6,271,690 B1 | 8/2001 | Hirano et al. ............... 327/75 |
| 5,880,870 | A | 3/1999 | Sieben et al. | 6,271,944 B1 | 8/2001 | Schemmann et al. |
| 5,883,910 | A | 3/1999 | Link | 6,281,824 B1 | 8/2001 | Masuda |
| 5,887,022 | A | 3/1999 | Lee et al. | 6,285,709 B1 | 9/2001 | Alelyunas et al. |
| 5,889,759 | A | 3/1999 | McGibney | 6,288,668 B1 | 9/2001 | Tsukamoto et al. |
| 5,896,392 | A | 4/1999 | Ono et al. | 6,289,055 B1 | 9/2001 | Knotz |
| 5,912,749 | A | 6/1999 | Harstead et al. | 6,289,151 B1 | 9/2001 | Kazarinov et al. |
| 5,920,600 | A | 7/1999 | Yamaoka et al. | 6,295,325 B1 | 9/2001 | Farrow et al. ............... 375/327 |
| 5,923,226 | A | 7/1999 | Kakura et al. | 6,297,678 B1 | 10/2001 | Gholami .................... 327/198 |
| 5,942,576 | A | 8/1999 | Evans et al. | 6,298,459 B1 | 10/2001 | Tsukamoto |
| 5,943,380 | A | 8/1999 | Marchesani et al. | 6,304,199 B1 | 10/2001 | Fang et al. |
| 5,943,457 | A | 8/1999 | Hayward et al. | 6,311,045 B1 | 10/2001 | Domokos ................... 455/78 |
| 5,949,926 | A | 9/1999 | Davies | 6,313,713 B1 | 11/2001 | Ho et al. .................... 333/1.1 |
| 5,959,032 | A | 9/1999 | Evans et al. | 6,314,147 B1 | 11/2001 | Liang et al. |
| 5,959,750 | A | 9/1999 | Eskildsen et al. | 6,317,247 B1 | 11/2001 | Yang et al. ................. 359/245 |
| 5,965,667 | A | 10/1999 | Evans et al. | 6,317,469 B1 | 11/2001 | Herbert |
| 5,968,198 | A | 10/1999 | Hassan et al. | 6,341,023 B1 | 1/2002 | Puc |
| 5,978,417 | A | 11/1999 | Baker et al. ................. 375/232 | 6,356,374 B1 | 3/2002 | Farhan ....................... 359/180 |
| 5,983,178 | A | 11/1999 | Naito et al. | 6,388,786 B1 | 5/2002 | Ono et al. |
| 5,985,999 | A | 11/1999 | Dominguez et al. | 6,411,117 B1 | 6/2002 | Hatamian ................... 324/765 |
| 5,995,565 | A | 11/1999 | Tong et al. | 6,421,155 B1 | 7/2002 | Yano |
| 5,999,300 | A | 12/1999 | Davies et al. | 6,445,476 B1 | 9/2002 | Kahn et al. ................. 359/184 |
| 6,002,274 | A | 12/1999 | Smith et al. | 6,473,131 B1 | 10/2002 | Neugebauer et al. |
| 6,002,717 | A | 12/1999 | Gaudet | 6,501,792 B2 | 12/2002 | Webster |
| 6,009,424 | A | 12/1999 | Lepage et al. | 6,531,931 B1* | 3/2003 | Benyamin et al. ............ 333/18 |
| 6,011,952 | A | 1/2000 | Dankberg et al. ............ 455/24 | 6,539,204 B1 | 3/2003 | Marsh et al. ................. 455/63 |
| 6,021,110 | A | 2/2000 | McGibney | 6,560,257 B1 | 5/2003 | DeSalvo et al. .......... 372/38.02 |
| 6,028,658 | A | 2/2000 | Hamada et al. | 6,650,189 B1 | 11/2003 | Romao |
| 6,031,048 | A | 2/2000 | Evans et al. | 6,665,348 B1 | 12/2003 | Feher |
| 6,031,866 | A | 2/2000 | Oler et al. | 6,665,500 B2 | 12/2003 | Snawerdt |
| 6,031,874 | A | 2/2000 | Chennakeshu et al. | 6,718,138 B1 | 4/2004 | Sugawara ....................... 398/9 |
| 6,034,996 | A | 3/2000 | Herzberg | 6,751,587 B2 | 6/2004 | Thyssen et al. ............. 704/228 |
| 6,035,080 | A | 3/2000 | Henry et al. | 6,816,101 B2 | 11/2004 | Hietala et al. ............... 341/155 |
| 6,041,299 | A | 3/2000 | Schuster et al. | 6,819,166 B1 | 11/2004 | Choi et al. .................. 327/551 |
| 6,052,420 | A | 4/2000 | Yeap et al. .................. 375/346 | 6,819,943 B2 | 11/2004 | Dalal |
| 6,072,364 | A | 6/2000 | Jeckeln et al. | 6,920,315 B1 | 7/2005 | Wilcox et al. |
| 6,072,615 | A | 6/2000 | Mamyshev | 6,961,019 B1 | 11/2005 | McConnell et al. ....... 342/357.1 |
| 6,078,627 | A | 6/2000 | Crayford | 7,035,361 B2 | 4/2006 | Kim et al. ................... 375/350 |
| 6,084,931 | A | 7/2000 | Powell, II et al. | 7,050,388 B2 | 5/2006 | Kim et al. ................... 370/201 |
| 6,091,782 | A | 7/2000 | Harano | 7,123,676 B2 | 10/2006 | Gebara et al. |
| 6,093,496 | A | 7/2000 | Dominguez et al. | 7,149,256 B2 | 12/2006 | Vrazel et al. |
| 6,093,773 | A | 7/2000 | Evans et al. | 7,173,551 B2 | 2/2007 | Vrazel et al. |
| 6,108,474 | A | 8/2000 | Eggleton et al. | 7,212,580 B2 | 5/2007 | Hietala et al. |
| 6,111,477 | A | 8/2000 | Klymyshyn et al. | 7,215,721 B2 | 5/2007 | Hietala et al. |
| 6,118,563 | A | 9/2000 | Boskovic et al. | 7,307,569 B2 | 12/2007 | Vrazel et al. |
| 6,118,567 | A | 9/2000 | Alameh et al. | 2001/0024542 A1 | 9/2001 | Aina et al. .................... 385/24 |
| 6,127,480 | A | 10/2000 | Dominguez et al. | 2002/0086640 A1 | 7/2002 | Belcher et al. .............. 455/63.1 |
| 6,140,416 | A | 10/2000 | Evans et al. | 2002/0093908 A1* | 7/2002 | Yeap .......................... 370/201 |
| 6,140,858 | A | 10/2000 | Dumont | 2002/0196508 A1 | 12/2002 | Wei et al. |
| 6,140,972 | A | 10/2000 | Johnston et al. | 2003/0002121 A1 | 1/2003 | Miyamoto et al. |
| 6,141,127 | A | 10/2000 | Boivin et al. | 2003/0007631 A1* | 1/2003 | Bolognesi et al. ....... 379/387.02 |
| 6,141,387 | A | 10/2000 | Zhang | 2003/0008628 A1 | 1/2003 | Lindell et al. |
| 6,148,428 | A | 11/2000 | Welch et al. | 2003/0030876 A1 | 2/2003 | Takei ......................... 359/187 |
| 6,151,150 | A | 11/2000 | Kikuchi | 2003/0053534 A1 | 3/2003 | Sivadas et al. .............. 375/229 |
| 6,154,301 | A | 11/2000 | Harvey | 2003/0058976 A1 | 3/2003 | Ohta et al. |
| 6,163,638 | A | 12/2000 | Eggleton et al. | 2003/0063354 A1 | 4/2003 | Davidson .................... 359/189 |
| 6,169,764 | B1 | 1/2001 | Babanezhad ................ 375/233 | 2003/0067990 A1* | 4/2003 | Bryant ....................... 375/259 |
| 6,169,912 | B1 | 1/2001 | Zuckerman ................ 455/570 | 2004/0053578 A1 | 3/2004 | Grabon et al. |
| 6,181,454 | B1 | 1/2001 | Nagahori et al. | 2004/0105462 A1 | 6/2004 | Kim et al. |
| 6,191,719 | B1 | 2/2001 | Bult et al. | 2004/0114888 A1 | 6/2004 | Rich et al. |
| 6,201,916 | B1 | 3/2001 | Eggleton et al. | 2004/0197103 A1 | 10/2004 | Roberts et al. .............. 398/159 |
| 6,208,792 | B1 | 3/2001 | Hwang et al. | 2004/0213354 A1 | 10/2004 | Jones et al. .................. 375/285 |
| 6,211,978 | B1 | 4/2001 | Wojtunik ..................... 359/114 | 2004/0218756 A1 | 11/2004 | Tang et al. ................... 379/417 |
| 6,212,654 | B1 | 4/2001 | Lou et al. | 2005/0069063 A1 | 3/2005 | Waltho et al. ............... 375/345 |
| 6,214,914 | B1 | 4/2001 | Evans et al. | 2005/0180520 A1 | 8/2005 | Kim et al. |
| 6,215,812 | B1* | 4/2001 | Young et al. ................. 375/144 | 2006/0146966 A1* | 7/2006 | Golanbari et al. ........... 375/343 |
| 6,219,633 | B1 | 4/2001 | Lepage | 2006/0159002 A1 | 7/2006 | Kim et al. |
| 6,222,861 | B1 | 4/2001 | Kuo et al. ...................... 372/20 | 2006/0178157 A1 | 8/2006 | Gebara et al. |
| 6,226,112 | B1 | 5/2001 | Denk et al. | 2006/0291598 A1 | 12/2006 | Gebara et al. |
| 6,236,963 | B1 | 5/2001 | Naito et al. | 2007/0060059 A1 | 3/2007 | Kim et al. |
| 6,259,836 | B1 | 7/2001 | Dodds | 2007/0064923 A1 | 3/2007 | Schmukler et al. |
| 6,259,847 | B1 | 7/2001 | Lenz et al. | 2007/0092265 A1 | 4/2007 | Vrazel et al. |
| 6,268,816 | B1 | 7/2001 | Bult et al. | 2007/0171998 A1 | 7/2007 | Hietala et al. |

2007/0253495 A1   11/2007   Kim

FOREIGN PATENT DOCUMENTS

| EP | 0 584 865 B1 | 3/2000 |
|---|---|---|
| GB | 2 223 369 A | 4/1990 |
| GB | 2 306 066 A | 4/1997 |
| JP | 62082659 | 10/1988 |
| JP | 1990000063162 | 11/1991 |
| JP | 04187738 | 7/1992 |
| JP | 08079186 A | 3/1996 |
| WO | WO 99/45683 | 9/1999 |
| WO | WO 01/41346 A2 | 6/2001 |
| WO | WO 02/067521 A1 | 8/2002 |
| WO | WO 02/082694 A1 | 10/2002 |
| WO | WO 02/091600 A2 | 11/2002 |
| WO | WO 03/071731 A1 | 8/2003 |
| WO | WO 03/077423 A2 | 9/2003 |
| WO | WO 03/092237 A1 | 11/2003 |
| WO | WO 2004/008782 A2 | 1/2004 |
| WO | WO 2004/045078 A2 | 5/2004 |
| WO | WO 2004/088857 A2 | 10/2004 |
| WO | WO 2005/018134 A2 | 2/2005 |
| WO | WO 2005/050896 A1 | 6/2005 |
| WO | WO/2006/065883 A2 | 6/2006 |

OTHER PUBLICATIONS

Weger et al.; *Gilbert Multiplier as an Active Mixer with Conversion Gain Bandwidth of up to 17GHz*; Electronics Letters; Mar. 28, 1991; vol. 27, No. 7; pp. 570-571.

International Search Report dated Apr. 18, 2006 for PCT/US03/22237.

André et al.; *InP DHBT Technology and Design Methodology for High-Bit-Rate Optical Communications Circuits*; IEEE Journal of Solid-State Circuits; vol. 33, No. 9, Sep. 1998; pp. 1328-1335.

Borjak et al.; *High-Speed Generalized Distributed-Amplifier-Based Transversal-Filter Topology for Optical Communication Systems*; IEEE Transactions on Microwave Theory and Techniques; vol. 45, No. 8; Aug. 1997; pp. 1453-1457.

Buchali et al.; *Fast Eye Monitor for 10 Gbit/s and its Application for Optical PMD Compensation*; Optical Society of America; (2000); pp. TuP5-1-TuP1-3.

Cartledge et al.; *Performance of Smart Lightwave Receivers With Linear Equalization*; Journal of Lightwave Technology; vol. 10, No. 8; Aug. 1992; pp. 1105-1109.

Chi et al.; *Transmission Performance of All-Optically Labelled Packets Using ASK/DPSK Orthogonal Modulation*; The 15th Annual Meeting of the IEEE Lasers and Electro-Optics Society, 2002; LEOS 2002; Nov. 10-14, 2002; vol. 1:51-52. The whole document.

Chiang et al.; *Implementation of STARNET: A WDM Computer Communications Network*; IEEE Journal on Selected Areas in Communications; Jun. 1996; vol. 14, No. 5; pp. 824-839.

Cimini et al.; *Can Multilevel Signaling Improve the Spectral Efficiency of ASK Optical FDM Systems?*; IEEE Transactions on Communications; vol. 41, No. 7; Jul. 1993; pp. 1084-1090.

Downie et al.; *Performance Monitoring of Optical Networks with Synchronous and Asynchronous Sampling*; Corning Incorporated, Science and Technology; SP-AR-02-1; p. WDD50-1; Abstract.

Enning et al.; *Design and Test of Novel Integrate and Dump Filter (I&D) for Optical Gbit/s System Applications*; Electronics Letters; (Nov. 21, 1991); vol. 27, No. 24; pp. 2286-2288.

Fürst et al.; *Performance Limits of Nonlinear RZ and NRZ Coded Transmission at 10 and 40 Gb/s on Different Fibers*; pp. 302-304, vol. 2, Mar. 7-10, 2000.

Garrett, Ian; *Pulse-Position Modulation for Transmission Over Optical Fibers with Direct or Heterodyne Detection*; IEEE Transactions on Communications; vol. COM-31; No. 4; Apr. 1983; pp. 518-527.

Godin et al.; *A InP DHBT Technology for High Bit-rate Optical Communications Circuits*; IEEE; (1997); pp. 219-222.

Haskins et al.; *FET Diode Linearizer Optimization for Amplifier Predistortion in Digital Radios*; IEEE Microwave and Guided Wave Letters; vol. 10, No. 1; Jan. 2000; pp. 21-23.

Hranilovic et al.; *A Multilevel Modulation Scheme for High-Speed Wireless Infrared Communications*; IEEE; (1999); pp. VI-338-VI-341.

Idler et al.; *40 Gbit/s Quaternary Dispersion Supported Transmission Field Trial Over 86 km Standard Singlemode Fibre*; 24th European Conference on Optical Communication; Sep. 1998; pp. 145-147.

Jutzi, Wilhelm; *Microwave Bandwidth Active Transversal Filter Concept with MESFETs*; IEEE Transactions on Microwave Theory and Technique, vol. MTT-19, No. 9; Sep. 1971; pp. 760-767.

Kaess et al.; *New Encoding Scheme for High-Speed Flash ADC's*; IEEE International Symposium on Circuits and Systems; Jun. 9-12, 1997; Hong Kong; pp. 5-8.

Kaiser et al.; *Reduced Complexity Optical Duobinary 10-Gb/s Transmitter Setup Resulting in an Increased Transmission Distance*; IEEE Photonics Technology Letters; Aug. 2001; vol. 13; No. 8; pp. 884-886.

Lee et al.; *Effects of Decision Ambiguity Level on Optical Receiver Sensitivity*; IEEE Photonics Technology Letters; vol. 7, No. 19; Oct. 1995; pp. 1204-1206.

Marcuse, Dietrich; *Calculation of Bit-Error Probability for a Lightwave System with Optical Amplifiers and Post-Detection Gaussian Noise*; Journal of Lightwave Technology; vol. 9, No. 4; Apr. 1991; pp. 505-513.

Megherbi et al.; *A GaAs-HBT A/D Gray-Code Converter*; IEEE; (1997); pp. 209-212.

Nazarathy et al.; *Progress in Externally Modulated AM CATV Transmission Systems*; Journal of Lightwave Technology; vol. 11, No. 1; Jan. 1993; pp. 82-105.

Oehler et al.; *A 3.6 Gigasample/s 5 bit Analog to Digital Converter Using 0.3 μm AlGaAs-HEMT Technology*; IEEE; (1993); pp. 163-164.

Ohm et al.; *Quaternary Optical ASK-DPSK and Receivers with Direct Detection*; IEEE Photonics Technology Letters; Jan. 2003; vol. 15, No. 1; pp. 159-161.

Ohtsuki et al.; *BER Performance of Turbo-Coded PPM CDMA Systems on Optical Fiber*; Journal of Lightwave Technology; vol. 18; No. 12; Dec. 2000; pp. 1776-1784.

Ota et al.; *High-Speed, Burst-Mode, Packet-Capable Optical Receiver and Instantaneous Clock Recovery for Optical Bus Operation*; Journal of Lightwave Technology; vol. 12, No. 2; Feb. 1994; pp. 325-331.

Poulton et al.; *An 8-GSa/s 8-bit ADC System*; Symposium on VLSI Circuits Digest of Technical Papers; (1997); pp. 23-24.

Poulton et al.; *A 6-b, 4 GSa/s GaAs HBT ADC*; IEEE Journal of Solid-State Circuits; vol. 30, No. 10.; Oct. 1995; pp. 1109-1118.

Poulton et al.; *A 6-bit, 4 GSa/s ADC Fabricated in a GaAs HBT Process*; IEEE; (1994); pp. 240-243.

Prasetyo et al.; *Application for Amplitude Gain Estimation Techniques for Multilevel Modulation in OFDM Systems*; IEEE; (1998); pp. 821-824.

Runge et al.; *High-Speed Circuits for Lightwave Communications*; 1999; World Scientific, pp. 181-184.

Shtaif et al.; *Limits on the Spectral Efficiency of Intensity Modulated Direct Detection Systems with Optical Amplifiers*; AT&T Labs Research; pp. MM1-1-MM1-3, 2001.

Su et al.; *Inherent Transmission Capacity Penalty of Burst-Mode Receiver for Optical Multiaccess Networks*; IEEE Photonics Technology Letters; vol. 6, No. 5; May 1994; pp. 664-667.

Vodhanel et al.; *Performance of Directly Modulated DFB Lasers in 10-Gb/s ASK, FSK, and DPSK Lightwave Systems*; Journal of Lightwave Technology; Sep. 1990; vol. 8, No. 9; pp. 1379-1386.

Vorenkamp et al.; *A 1Gs/s, 10b Digital-to-Analog Converter*; ISSCC94/Session 3/Analog Techniques/Paper WP 3.3; pp. 52-53, Date: Feb. 16-18, 1994.

Wakimoto et al.; *Si Bipolar 2-GHz 6-bit Flash A/D Conversion LSI*; IEEE Journal of Solid-State Circuits; Dec. 1988; vol. 23, No. 6; pp. 1345-1350.

Walkin et al.; *A 10 Gb/s 4-ary ASK Lightwave System*; ECOC; 1997; pp. 255-258.

Walklin et al.; *Multilevel Signaling for Extending the Dispersion-Limited Transmission Distance in High-Speed, Fiber Optic Communication Systems*; IEEE; 1996; pp. 233-236.

Walklin et al.; *Multilevel Signaling for Increasing the Reach of 10 Gb/s Lightwave Systems*; IEEE Journal of Lightwave Technology; vol. 17; No. 11; Nov. 1999; pp. 2235-2248.

Wang et al.; *Multi-Gb/s Silicon Bipolar Clock Recovery IC*; IEEE Journal on Selected Areas in Communications; vol. 9, No. 5; Jun. 1991; pp. 656-663.

Webb, William T.; *Spectrum Efficiency of Multilevel Modulation Schemes in Mobile Radio Communications*; IEEE Transactions on Communications; vol. 43, No. 8; Aug. 1995; pp. 2344-2349.

Wedding et al.; *Multi-Level Dispersion Supported Transmission at 20 Gbit/s Over 46 km Installed Standard Singlemode Fibre*; 22$^{nd}$ European Conference on Optical Communication; 1996; pp. 91-94.

Wedding et al.; *Fast Adaptive Control for Electronic Equalization of PMD*; Optical Society of America; (2000); pp. TuP4-1-TuP4-3.

Westphal et al.; *Lightwave Communications*; 1994; Thursday Afternoon/CLEO '94; pp. 337-338.

Wilson et al.; *Predistortion of Electroabsorption Modulators for Analog CATV Systems at 1.55 µm*; Journal of Lightwave Technology; vol. 15, No. 9; Sep. 1997; pp. 1654-1662.

Author: Unknown; *Digital Carrier Modulation Schemes*; Title: Unknown; Date: Unknown; pp. 380-442.

International Search Report for PCT Application No. PCT/US03/35887 dated Jun. 4, 2004.

Choi et al.; *A 0.18-µm CMOS 3.5-Gb/s Continuous-Time Adaptive Cable Equalizer Using Enhanced Low-Frequency Gain Control Method*; IEEE Journal of Solid-State Circuits; Mar. 2004; vol. 39, No. 3; pp. 419-425.

Paul, et al.; *3 Gbit/s Optically Preamplified Direct Detection DPSK Receiver With 116 photon/bit Sensitivity*; Electronics Letters; vol. 29, No. 7; Apr. 1, 1993; pp. 614-615.

Penninckx et al.; *Optical Differential Phase Shift Keying (DPSK) Direct Detection Considered as a Duobinary Signal*; Proc. 27$^{th}$ Eur. Conf. on Opt. Comm. (ECOC'01—Amsterdam); vol. 3; Sep. 30 to Oct. 4, 2001; pp. 456-457.

Rohde et al.; *Robustness of DPSK Direct Detection Transmission Format in Standard Fibre WDM Systems*; Electronics Letters; vol. 36, No. 17; Aug. 17, 2000; pp. 1483-1484.

Shirasaki et al.; *Fibre Transmission Properties of Optical Pulses Produced Through Direct Phase Modulation of DFB Laser Diode*; Electronics Letters; vol. 24, No. 8; Apr. 14, 1988; pp. 486-488.

International Search Report dated Oct. 8, 2004 from International Application No. PCT/US04/09136.

Kannangara et al.; *Adaptive Duplexer for Multiband Transreceiver*; Radio and Wireless Conference; Aug. 10-13, 2003; RAWCON '03; pp. 381-384.

Kannangara et al.; *Adaptive Duplexer for Software Radio*; Approximate Date: Nov. 11-13, 2002.

Kannangara et al.; *An Algorithm to Use in Adaptive Wideband Duplexer for Software Radio*; IEICE Transactions on Communications; Dec. 2003; vol. E86-B, No. 12; pp. 3452-3455.

Kannangara et al.; *Performance Analysis of the Cancellation Unit in an Adaptive Wideband Duplexer for Software Radio*; ATcrc Telecommunications and Networking Conference & Workshop, Melbourne, Australia, Dec. 11-12, 2003.

Williamson et al., *Performance Analysis of Adaptive Wideband Duplexer*; 2003 Australian Telecommunications, Networks and Applications Conference (ATNAC); Dec. 8-10, 2003.

* cited by examiner

ADAPTIVE NOISE FILTERING AND EQUALIZATION FOR OPTIMAL HIGH SPEED MULTILEVEL SIGNAL DECODING

PRIORITY AND RELATED APPLICATIONS

This application is a continuation of and claims priority under 35 U.S.C. § 120 to application Ser. No. 10/620,477 filed Jul. 15, 2003, now U.S. Pat. No. 7,035,361 entitled "Adaptive Noise Filtering and Equalization for Optimal High Speed Multilevel Signal Decoding," the entire contents of which are incorporated by reference.

FIELD OF THE INVENTION

The present invention relates to communication systems and improving the received signal quality in a high-speed communications environment through the use of equalization. The improvement in signal quality affords gains in system performance such as increased data throughput capacity or reduced error rate. Specifically, the present invention relates to a method and system for improving the quality of a received signal by counteracting distortions introduced in signal generation, transmission, and reception.

BACKGROUND OF THE INVENTION

Network bandwidth consumption is rising at a rapid rate. Existing network capacity is marginally adequate and is expected, as of this writing, to soon be inadequate. Thus, there is a need to increase network bandwidth capacity. This increase in bandwidth can be achieved by increasing the symbol transmission rate to yield a corresponding increase in the data rate or by using advanced modulation techniques with higher spectral efficiency (i.e. techniques that communicate more than one information bit per symbol).

Regardless of the technique employed to achieve higher data throughput, the higher data throughput can place more stringent requirements on the fidelity of the signal communicated. Fidelity of the signal communicated can be hampered by signal degradation. Signal degradation can occur during signal generation and signal transmission. Signal degradation incurred in generating and transmitting a signal over a channel can largely be categorized as arising from two sources: (i) filtering of the signal and (ii) corruption from noise.

In classical communications (e.g. wireless or wireline communications), the noise component is commonly addressed by using optimal detection (i.e. matched-filtering followed by optimal thresholding). However, such a conventional approach often neglects the inter-symbol interference (ISI) associated with the filtering that occurs in the channel, i.e. that approach assumes that the noise is the dominant source of distortion. If the ISI is the dominant source of signal degradation, then the conventional approach is to equalize the channel, e.g. filter the received signal with an inverse filter prior to detection. The use of any one of these approaches in isolation may not improve signal fidelity since matched-filtering and equalization are often contradicting goals.

For example, equalization generally corresponds to high-pass filtering which, while removing ISI, increases the presence of high-frequency noise. A low-pass filter (LPF) is usually employed to the equalized signal in order to reduce the effect of the high-frequency noise but which also re-introduces ISI. Matched-filtering, on the other hand, is often low-pass in nature and thus frequently exacerbates the ISI in the signal in the process of reducing noise.

The separate application of matched-filtering and equalization can be characterized as "ad-hoc" because it does not consider the problem of noise mitigation and equalization in a combined framework, and thus, neglects the impact each has on the other.

There exist techniques in the conventional art which address noise mitigation and equalization in a common framework. In particular, the well-known Least-Mean Squares (LMS) based approaches minimize a distortion measure that captures the impact of both noise and ISI. Furthermore, these methods are adaptive in the sense that the settings of the filter are automatically adjusted to the optimal value. This adaptive feature is often necessary as the exact characteristics of the channel distortion and noise spectral content vary from installation to installation and also with time and temperature in some instances.

Unfortunately, the use of these traditional adaptive LMS-based control methodologies for high-data rate systems can be impractical due to data acquisition and processing difficulties. In particular, it can be economically impractical (and often technically infeasible) to (i) produce the analog-to-digital converters (ADC's) capable of digitizing the signal at the required speed and resolution and (ii) produce a processor capable of handling the digitized data at the high speeds.

Therefore, there is a need in the art for an adaptive filtering approach that combines channel equalization and noise filtering. Another need exists in the art for a method and system for high speed digital communications that combines channel equalization and noise filtering in a single framework and that can account for the effects that equalization can have on noise filtering, and vice-versa. Additionally, there is a need for such a method and system which is economically and technically practical for high-speed data systems.

SUMMARY OF THE INVENTION

A Signal Conditioning Filter (SCF) and a Signal Integrity Unit (SIU) can control elements that filter a digital (i.e. binary or multilevel) signal. A multilevel signal uses discrete amplitudes, which can change from one time interval to another, to convey information in each time interval. The simplest example of multilevel signaling is binary signaling where two amplitudes are used to represent a logical 0 or 1 (i.e. one bit of information). By using more levels, more information can be conveyed with each symbol or in each time interval. In some of the prior art and conventional art, the term "multilevel" conveys the use of more than two amplitude levels. To avoid any ambiguity, the term "digital signaling" will be used in this writing to refer to signaling with discrete amplitudes and time intervals, i.e. digital signaling that can include both binary and multilevel signaling.

The SCF and SIU form part of a method and system for equalizing and filtering a digital signal. This method and system for equalizing and filtering may be used in a variety of high-speed communications systems. Applications can include, but are not limited to, (i) electrical systems such as backplane, telecom, and datacom systems and (ii) optical systems such as long-haul, metro, and short-reach applications.

Regardless of the application, the method and system can process a received digital signal in the electrical domain prior to decoding. Thus, in optical systems, the method and system can be used either after photodetection in the receiver or prior to modulation in the transmitter.

The present invention can address the coupled problem of equalization and noise filtering in order to improve signal fidelity for decoding. Specifically, a received digital signal can be filtered in a manner to optimize the signal fidelity even in the presence of both significant (large magnitudes of) ISI and noise. Furthermore, the method and system of the present invention can be adaptive in the sense that filter coefficients can be continuously updated to reflect any time-varying changes in the system characteristics.

The present invention can provide an adaptive method that continuously monitors a signal fidelity measure. For example, monitoring the fidelity of a digital signal can be performed by external means such as a Signal Integrity Unit (SIU). A received signal y(t) can be "conditioned" by application of a filter with an electronically adjustable impulse response g(t). A resulting output z(t) can then be interrogated to characterize the quality of the conditioned signal.

This fidelity measure q(t) can then be fed back to the SCF. Utilizing the signal fed back to the SCF, the response of the SCF can be adjusted to maximize the received fidelity measure. For the SIU, the signal fidelity measure can be directly associated with a decision error probability in a subsequent decoder with optimal decision thresholds. Combining the proposed approach with such a control system can balance (in a principled fashion) the trade-off between the degree to which ISI is corrected and noise is mitigated for optimal decoding.

The SCF can include a cascade of two or more tapped delay line filters with electronically controllable gain coefficients. The tap spacings of the two filters can be different in order to effectively combat both the effect of ISI which occurs on a large time scale and the effects of noise, jitter, and signal ringing which occur on a small time scale.

Using a cascade of two distinct filters can minimize the number of taps required to address both of these phenomena. The delay lines in these filters can include artificial transmission lines which can absorb the parasitic capacitance of the tap amplifiers. The tap amplifiers which vary the gain coefficients can be implemented using special Gilbert cell multipliers.

DETAILED DESCRIPTION OF THE EXEMPLARY EMBODIMENTS

The present invention can address the problems of equalization and noise filtering in order to improve signal fidelity for decoding. Specifically, a received digital signal can be filtered in a manner to optimize the signal fidelity even in the presence of both large magnitudes of ISI and noise. Furthermore, the method and system of the present invention can be adaptive in the sense that filter coefficients can be continuously updated to reflect any time-varying changes in the channel behavior.

Filter Structure

Figure 1A:
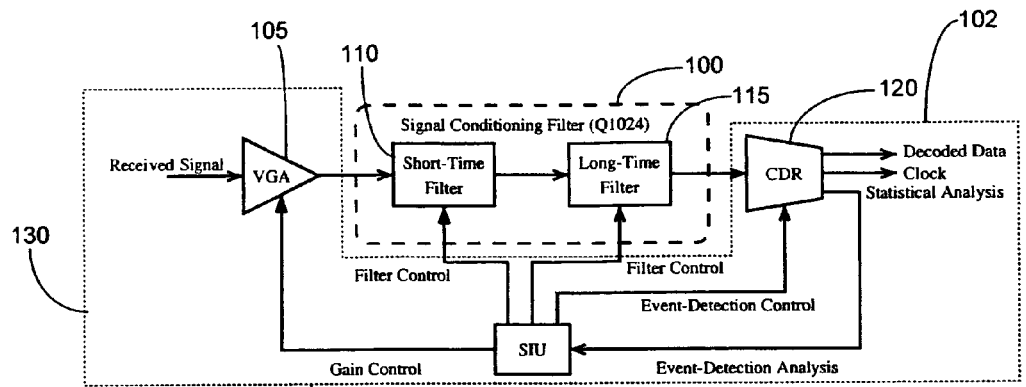
FIG. 1A illustrates a digital signal receiver architecture according to one exemplary embodiment of the present invention.

Referring now to FIG. 1A, an equalization and filtering system 102 can comprise a variable gain amplifier 105, a signal conditioning filter (SCF) 100, a decoder or clock and data recovery (CDR) unit 120, and a signal integrity unit (SIU) 125. The CDR 120, SIU 125, and VGA 105 can form parts of a signal detection and fidelity characterization circuit 130 as will be discussed below with respect to FIG. 2. The exemplary signal conditioning filter (SCF) 100 can comprise two filters, a short-time filter 110 and a long-time filter 115 that are cascaded together.

According to one exemplary embodiment, each filter 110, 115 of the signal conditioning filter 100 can comprise a tapped-delay line or finite impulse response (FIR) filter with electrically controllable gain coefficients. Filtering is separated into these two stages, where the short-time filter 110 can comprise the first stage and the long-time filter can comprise the second stage. Each stage is designed to address a particular type of distortion using a relatively small number of taps.

As its name implies, the short-time filter 110 can be designed to mitigate degradations such as ringing, noise, and timing jitter that can occur on a relatively small time scale. Meanwhile, the long-time filter 115 is designed to remove signal artifacts (such as ISI) that can occur on a larger time scale.

Figure 1B:
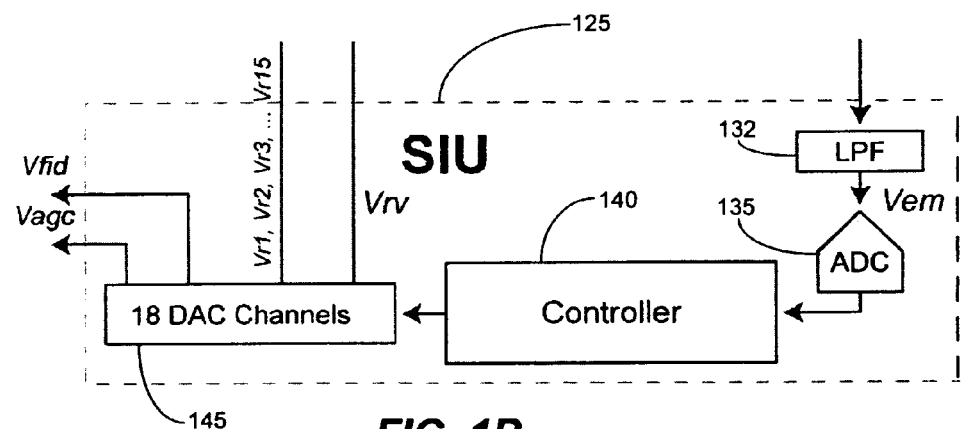
FIG. 1B illustrates a signal integrity unit according to one exemplary embodiment of the present invention.

Referring now to FIG. 1B, the signal integrity unit 125 can comprise a low pass filter (LPF) 132 and an analog-to-digital converter 135, a controller or processor 140, and a plurality of digital-to-analog converters (DACs) 145. After low-pass filtering by the LPF 132, a DC component of the sampled signal remains and is termed the event monitor voltage and is an analog probability estimate for the controlled reference voltage exceeding the received signal y(t) where controlled reference voltage is generated by the digital-to-analog converters 145.

As mentioned above, the output of the LPF 132 can be fed to the analog-to-digital converter (ADC) 135. The ADC 135 may be characterized as a low-speed high-resolution ADC that measures the averaged event-detector output representing the cumulative distribution function (CDF) value. Specifically, the reference voltage is swept over a range of voltage levels while the ADC 135 samples the voltage from the filter 132 to produce an estimate of the CDF. The SIU 125 can set the reference voltage via the DAC 145 to a fixed value and then measures the averaged event detection output. The SIU 125 can then set the reference voltage to a different fixed value and measures another point of the CDF. This process is completed until the CDF curve is formed.

The ADC 135 feeds its output to a microcontroller 140. Microcontroller 140 can process the cumulative distribution function (CDF) to determine threshold voltage values for signal decoding, receiver gain for the variable gain amplifier 105, and filter coefficients for the SCF 100. The microcontroller 140 is responsible for feeding the filter coefficients to the SCF for equalizing and filtering the received signal. Further details of the signal integrity unit 125 are discussed in the commonly owned U.S. Non-provisional Application Ser. No. 10/108,598 entitled, "METHOD AND SYSTEM FOR DECODING MULTILEVEL SIGNALS," filed on Mar. 28, 2002 in the name of Vincent Hietala et al., the entire contents of which are hereby incorporated by reference.

Figure 2:
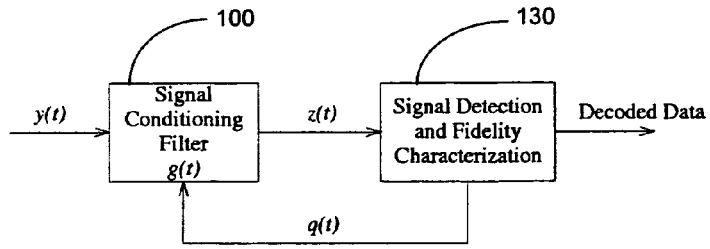
FIG. 2 illustrates an equalization architecture according to one exemplary embodiment of the present invention.

Referring now to FIG. 2, a first input to the signal conditioning filter (SCF) 100 can comprise a signal y(t) that can include an unfiltered received signal while the output to the SCF 100 can comprise a filtered signal z(t). The filtered signal z(t) can be propagated into the signal detection and fidelity characterization circuit 130. As mentioned above, the signal detection and fidelity characterization circuit 130 can comprise a CDR 120 and SIU 125.

A first output of the signal detection and fidelity characterization circuit 130 can comprise the decoded data from the filtered signal z(t). A second output of the signal detection and fidelity characterization circuit 130 can comprise a control signal q(t) that forms a second input to the SCF 100.

Figure 3:
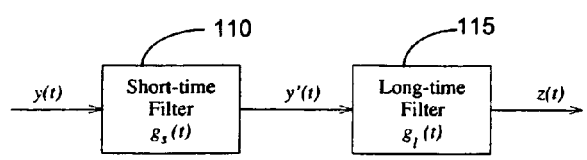
FIG. 3 illustrates a short-time filter and a long-time filter that form a signal conditioning filter according to one exemplary embodiment of the present invention.

Referring now to FIG. 3, as noted above with respect to FIG. 1, the SCF 100 can comprise a short-time filter 110 that receives the signal y(t) discussed above with respect to FIG. 2. The short-time filter 110 manipulates the signal y(t) according to a first function $g_S(t)$. The output from the short-time filter 110 can comprise a first filtered signal y-prime'(t) that is fed as the input to the long-time filter 115.

The long-time filter 115 manipulates the signal y-prime'(t) according to a second function $g_L(t)$. The output from the long-time filter 115 can comprise a second filtered signal or z(t) as mentioned above with respect to FIG. 2 that is fed as the input to the CDR 120 or SIU 125 (not shown in FIG. 2).

Figure 4:
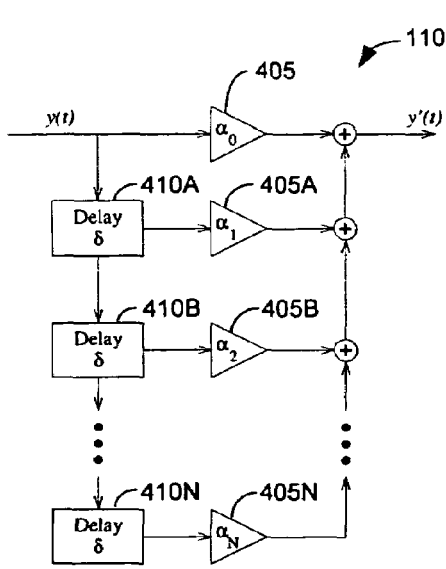
FIG. 4 illustrates a short-time filter in the form of a tapped-delay line filter with small tap delays less than a symbol period of a digital signal according to one exemplary embodiment of the present invention.

Referring now to FIG. 4, the exemplary short-time filter 110 can comprise a tapped-delay line filter with amplifiers 405 and N delay elements 410 (each with delay $\delta$) and N+1 amplifiers with gain coefficients $\alpha_n$ for n=0, ..., N. The delay $\delta$ can be chosen to be small (relative to the symbol period $T_0$ of the signal) to permit the short-time filter 110 to perform at least one of three functions: (1) compensate for signal distortions (such as ringing) that can occur within a single symbol period; (2) effectively integrate over less than a symbol period to integrate out and reduce the noise; and (3) adjust the amount of signal smoothing to be large enough to reduce the effects of signal distortion and noise but to be short enough to be robust relative to the timing jitter in the system.

The short-time filter 110 can support a frequency resolution of $1/N\delta$. It is assumed that the delay $\delta$ is sufficiently small so that there is no aliasing in the short-time filter 110. Specifically, the short-time filter 110 has a frequency response that is periodic in frequency with period $1/\delta$. Any signal (or noise) energy at frequencies higher than $f=1/(2\delta)$ will distort the filtered signal as they overlap into adjacent spectral periods. Because of this distortion, it is recommended that the signal be pre-filtered with a passive analog low-pass filter (not shown) prior to the short-time filter 110. This pre-filtering may not needed if any of the receiver components already sufficiently bandlimits the signal, as is often the case with circuit hardware and the high speeds considered.

The output of the short-time filter 110 can be written as $$y'(t) = \alpha_0 y(t) + \alpha_1 y(t-\delta) + \ldots + \alpha_N y(t-N\delta) \qquad (1)$$

or equivalently as $$y'(t)=[\alpha_0+\alpha_1+ \ldots +\alpha_N]y(t)-\alpha_1[y(t)-y(t-\delta)]- \ldots -\alpha_N[y(t)-y(t-N\delta)] \quad (2)$$

where the latter form explicitly conveys how the short-time filter 110 operates on the difference between the current sample and a sample from the past, i.e. each term can provide a first-order correction for the signal fluctuation within a symbol period. Furthermore, the coefficient on y(t) in Eq. (2) provides the DC gain of the signal, i.e. the gain on the signal when the signal is already flat within a symbol period, and hence, all the differential terms are zero. As a reference, unity DC gain can be chosen by setting $\alpha_0$ to $$\alpha_0=1-\alpha_1- \ldots -\alpha_N \quad (3)$$

or by alternatively normalizing the filter coefficients to sum to one.

Figure 5:
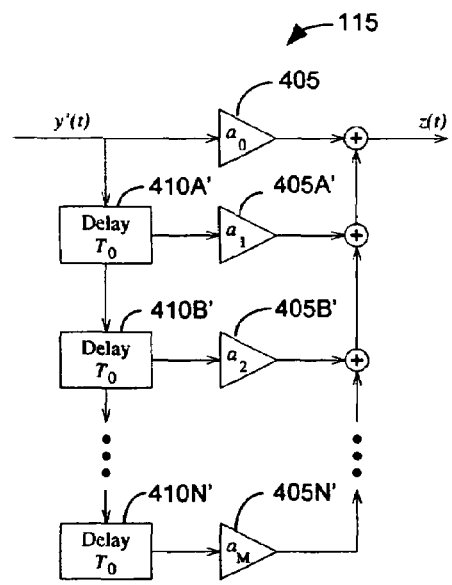
FIG. 5 illustrates a long-time filter in the form of a tapped-delay line filter with delays substantially equal to the symbol period according to one exemplary embodiment of the present invention.

Referring now to FIG. 5, the exemplary long-time filter 115 can comprise a tapped-delay line filter with M delay elements 410' (each with a delay equal to the symbol period $T_0$) and M+1 amplifiers 405 with gain coefficients $a_m$ for m=0, . . . , M. The purpose of this long-time filter 115 is to remove ISI which occurs between symbols. Because the short-time filter 110 is capable of smoothing the signal over a significant portion of the symbol period, the long-time filter 115 need not worry about aliasing associated with the signal frequencies higher than the sampling rate $1/T_0$. If the short-time filter 115 were not present, then an anti-aliasing filter with a low-cutoff frequency may be needed.

Similar to Eqs. (1) and (2), the output of the long-time filter 115 can be written as $$z(t)=\alpha_0 y'(t)+\alpha_1 y'(t-T_0)+ \ldots +\alpha_M y'(t-MT_0) \quad (4)$$

or equivalently, $$z(t)=[\alpha_0+\alpha_1+ \ldots +\alpha_M]y(t)-\alpha_1[y'(t)-y'(t-\Delta)]- \ldots -\alpha_M[y'(t)-y'(t-M\Delta)] \quad (5)$$

where again, a unity DC gain can be arbitrarily chosen by setting $$\alpha_0=1-\alpha_1- \ldots -\alpha_N \quad (6)$$

or by scaling the coefficients to sum to one.

Those skilled in the art can extend the exemplary filters in FIGS. 4 and 5 to account for subsequent as well as preceding signal samples. For example, additional L taps could be added to the short-time filter 110 of FIG. 4 to change Eq. (2) to yield $$y'(t)=[\alpha_0+ \ldots +\alpha_{N+L}]y(t)-\alpha_1[y(t)-y(t-\delta)]- \ldots -\alpha_{N+L}[y(t)-y(t-(N+L)\delta)].$$

The signal sample y(t−Lδ) can be interpreted as the sample to be decoded, i.e. where the decoding has been delayed by process by time Lδ. Because, the signal points y(t) through y(t−(L−1)δ) precede y(t−Lδ), the ISI associated from these symbols can be removed. Thus, the short-time filter 110 can now remove ISI originating from both preceding and succeeding signal samples. The long-time filter 115 may be similarly modified. This extension can be applied to both the short and long-time filters 110, 115 in practice as it can help improve equalization.

Filtering in the Transmitter

Figure 6:
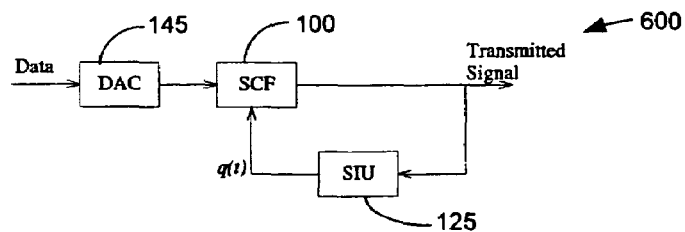
FIG. 6 illustrates a signal conditioning filter (SCF) forming part of a communications transmitter according to one exemplary embodiment of the present invention.

Referring now to FIG. 6, although described for use in a receiver, the SCF 110 may also be used in a transmitter 600 to maximize the fidelity of the transmit signal before channel noise is introduced which limits signal restoration in a corresponding receiver (not shown). Specifically, SCF 100 and SIU 125 modules may be placed in the transmitter 600 immediately before transmission circuitry as illustrated in FIG. 6 where these modules can be used to minimize the effects of ringing, ISI, circuit impedance mismatches, and noise introduced by the transmitter.

Removing these distortions prior to transmission is advantageous because the noise introduced by the channel limits the degree to which the transmitter 600 distortions can be compensated by the receiver's SCF 100. Additionally, if a supervisory communications link is available between the transmitter 600 and receiver (not shown), then the fidelity signal q(t) may be fed from the receiver (not shown) to the transmitter 600 over this link so that the SCF 100 in the transmitter not only compensates for transmitter distortions, but also pre-compensates for link distortions. This pre-compensation would be advantageous because it prevents the noise introduced by the link from limiting the degree to which the channel distortions can be compensated.

Filter Realization

Figure 7:
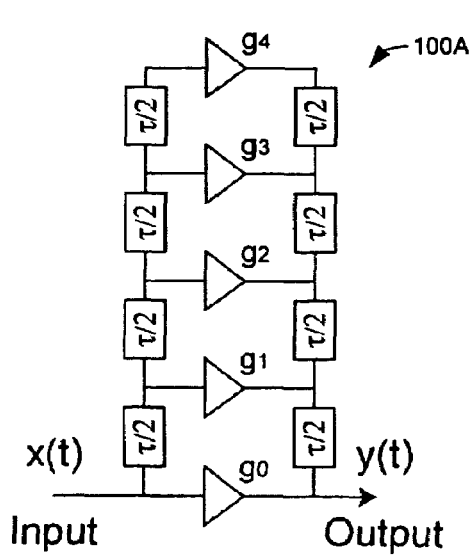
FIG. 7 is a functional block diagram illustrating a tapped-delay line filter according to one exemplary embodiment of the present invention.

The exemplary short- and long-time filters 110, 115 forming the SCF 100 can be implemented using an integrated tapped-delay line filter structure 100A with the basic structure illustrated in FIG. 7. This exemplary filter structure 100A is functionally identical to the conceptual tapped-delay line filter diagrams of FIGS. 3 and 4 if τ is associated with δ for FIG. 4 and $T_0$ for FIG. 5.

The filter structure 100A shown in FIG. 7 offers efficient "re-use" of the time delays for the various signal paths. This can be important since time delays are generally physically quite large and thus difficult to integrate. Therefore, it is desirable to make optimal use of all delay elements.

Figure 8:
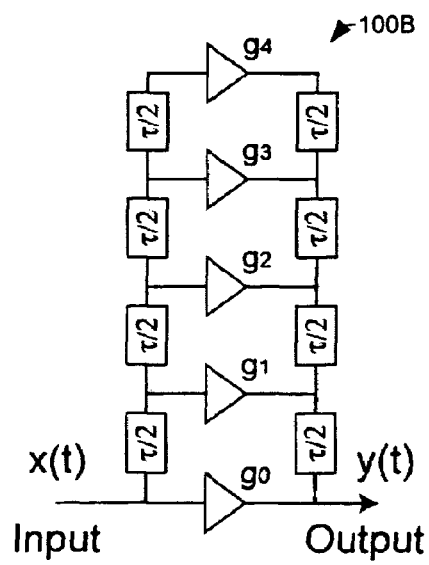
FIG. 8 is a functional block diagram illustrating a tapped-delay line filter and one of the exemplary signal paths according to one exemplary embodiment of the present invention.

To understand this efficient "re-use" of the delays, shown in FIG. 8 is the signal path for the third filter tap with gain coefficient g3. For this tap, by inspection, the total signal delay will be six times (×) τ/2 or 3τ. Similarly, by observation, the delay of the signal for each tap $g_i$ is i (times)×τ. Thus, the output signal y(t) can be represented as follows:

$$y(t) = \sum_{k=0}^{4} g_k x(t - k\tau), \quad (7)$$

which is identical to the form of Equations (1) and (4) discussed above.

Figure 9:
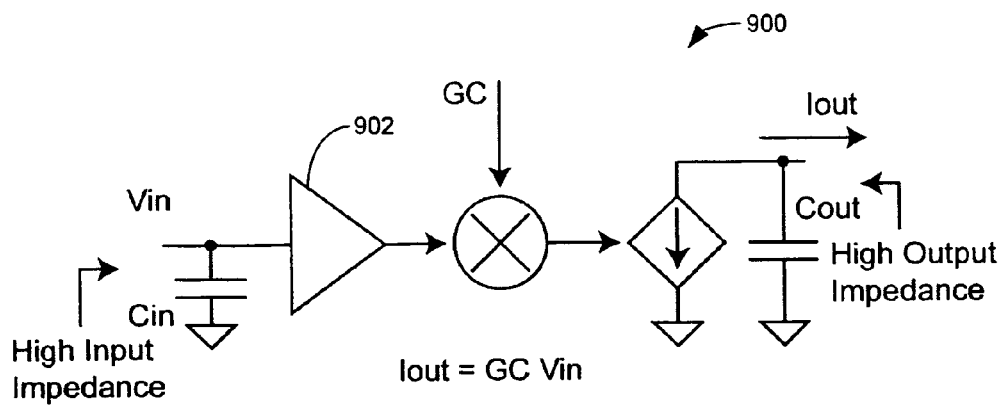
FIG. 9 is a functional block diagram illustrating a variable gain tap amplifier according to one exemplary embodiment of the present invention.

A block diagram of an exemplary variable gain tap amplifier 900 for a tap filter is illustrated in FIG. 9. In this exemplary embodiment, the gain constant GC is multiplied with the signal Vin to allow for both positive and negative gain coefficients. The input signal Vin is amplified/buffered, multiplied by the gain coefficient GC, and then output as a current source Iout. The input amplifier/buffer 902 is designed to have high input impedance as to not disturb the input delay line. The output of the amplifier 900 is also designed to be high impedance as to similarly not disturb the output delay line. In practice, a significant parasitic capacitance remains at both the input and output of the amplifier 900, but as will be seen below, these parasitics can be absorbed into the delay lines.

For one exemplary embodiment of the present invention, a delay element can comprise a simple LC (inductor-capacitor) delay line. However, those skilled in art will recognize that other delay elements can be used and are not beyond the scope and spirit of the present invention.

Figure 10:
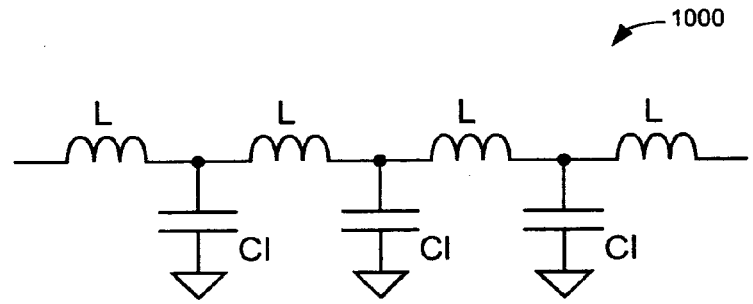
FIG. 10 is a circuit diagram illustrating a lumped LC delay line that has terminations provided on either end according to one exemplary embodiment of the present invention.

A representative LC delay line 1800 is illustrated in FIG. 10. This delay line 1000 forms a high order low-pass filter function with a relatively constant delay over the passband. Those skilled-in-the-art will recognize that a variety of filter design methodologies could be employed to construct higher performance delay structures, but the one shown in FIG. 10 was used for simplicity. It should also be realized that the lumped elements could be realized by distributed elements or in fact a variety of different delay elements could be similarly used.

For the simple delay structure shown; assuming constant L and, $C_l$, the delay, $\tau$ is approximately:

$$\tau \approx N_{LC}\sqrt{LC_l} \qquad (8)$$

in which $N_{LC}$ is the number of LC pairs and the filter's termination resistance, $R_o$ is:

$$R_o \approx \sqrt{\frac{L}{C_l}} \qquad (9)$$

The end of each delay element needs to be terminated with $R_o$ in parallel with a capacitor of approximately $C_l/2$ for proper operation.

Figure 11:
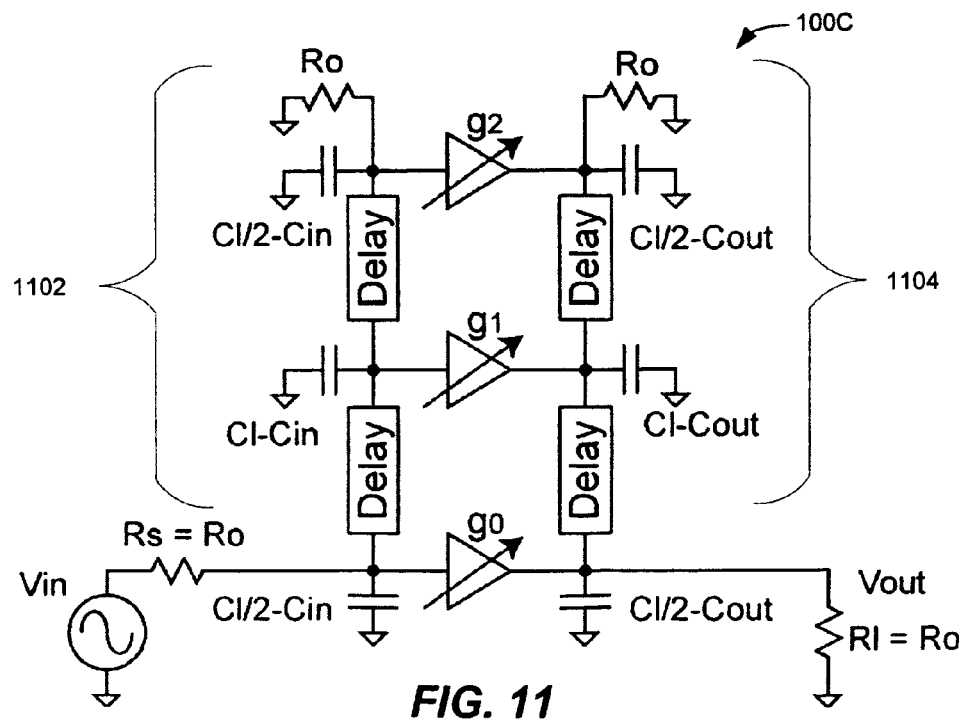
FIG. 11 is a circuit diagram illustrating an three-tap tapped-delay line filter having variable gain amplifiers described in FIG. 18 and delay blocks described in FIG. 19 according to one exemplary embodiment of the present invention.

Referring now to FIG. 11, an exemplary embodiment of a three tap tapped-delay line filter 100C using the variable gain tap amplifier of FIG. 9 and the lumped LC delay element shown in FIG. 10 is illustrated. Several important design aspects of this filter structure 100C can now be explained.

First, it is important to realize that the cascade of delay elements 1102 and circuitry on the left-hand side of the circuit 100C is designed to form a well controlled delay line. This will be referred to as the "input delay line" 1102. Similarly, on the right-hand side of the circuit 100C comprising the two delay elements and associated circuitry in this simple exemplary embodiment, will be referred to as the "output delay line" 1104.

Both the input and output delay lines 1102, 1104 are designed to have minimal signal attenuation and reflections in order to maintain good signal fidelity. As such, as already mentioned, the inputs of the amplifiers g were designed with high impedance and the remaining input capacitance is "absorbed" into the loading capacitance of the input delay line 1102.

This absorbed capacitance can be seen in FIG. 11 by the reduced values of loading capacitance ($C_l$–$C_{in}$). Additionally, the input and the output of the input delay lines 1102, 1104 are carefully terminated in the characteristic resistance ($R_o$) of the delay elements. Similarly, the output delay line 1104 absorbs the output parasitic capacitance of the amplifiers and is terminated with the appropriate resistance ($R_o$). The output of each amplifier g launches a signal in both directions in the output delay line 1104 and thus it can be appreciated why proper termination can be critical for proper filter operation.

FIGS. 12 through 15 illustrate an exemplary circuit embodiment of two tap tapped-delay line filters. The designs are fully differential, but one skilled-in-the-art will realize that the concepts discussed above are equally applicable to differential or single-ended designs. The particular exemplary embodiments illustrated in these figures are for integration in a GaAs HBT process. One skilled-in-the-art will realize that other device technologies could similarly be applied.

Figure 12:
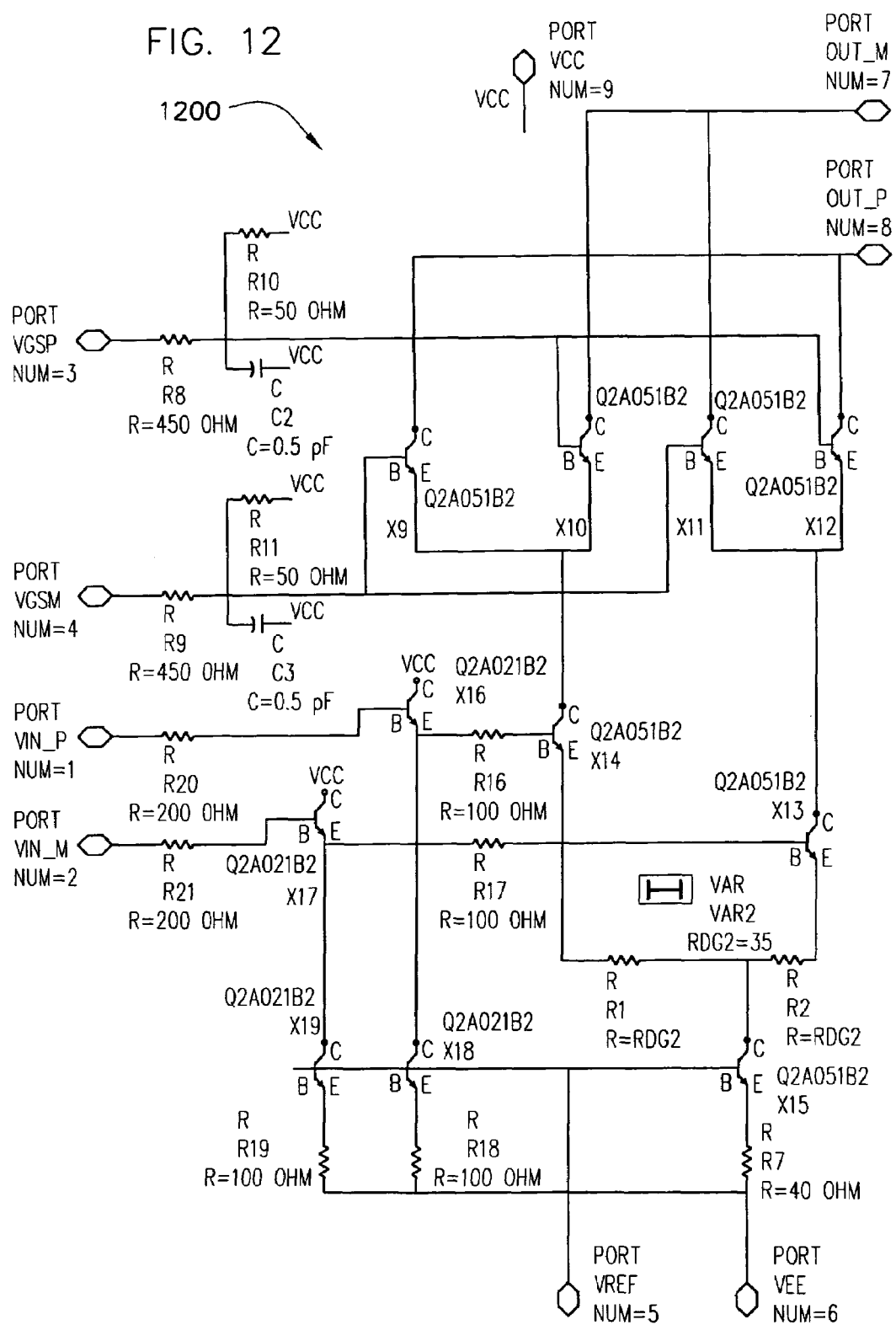
FIG. 12 is a circuit diagram of a variable gain tap amplifier according to one exemplary embodiment of the present invention.

Specifically, FIG. 12 illustrates the circuit diagram of an exemplary variable gain tap amplifier 1200. The input is first buffered by high input-impedance emitter follower amplifiers X16 and X17. The output of the emitter follower amplifiers drives a lower pair of a standard Gilbert cell multiplier circuit (also called a Gilbert cell mixer and an XOR gate) comprising X14, X13, X9, X10, X11 and X12. The bases of the upper cross connected differential pairs are held at the desired DC gain constant. Since this circuit is an effect 4-quadrant multiplier, the gain coefficient can be negative or positive.

The R8, R10 and R9, R11 resistor divider networks scale the input drive voltage so that desired coefficient control range is achieved (approx. +/−1 V in this case). The output of the Gilbert cell multiplier circuit is terminated by the output delay line. The Gilbert cell multiplier will usually see a real load resistance of $R_o/2$. The output will have a significant output capacitance due the collector capacitances of X9, X10, X11, and X12, but as discussed above, this capacitance can be absorbed into the output delay line.

Figure 13:
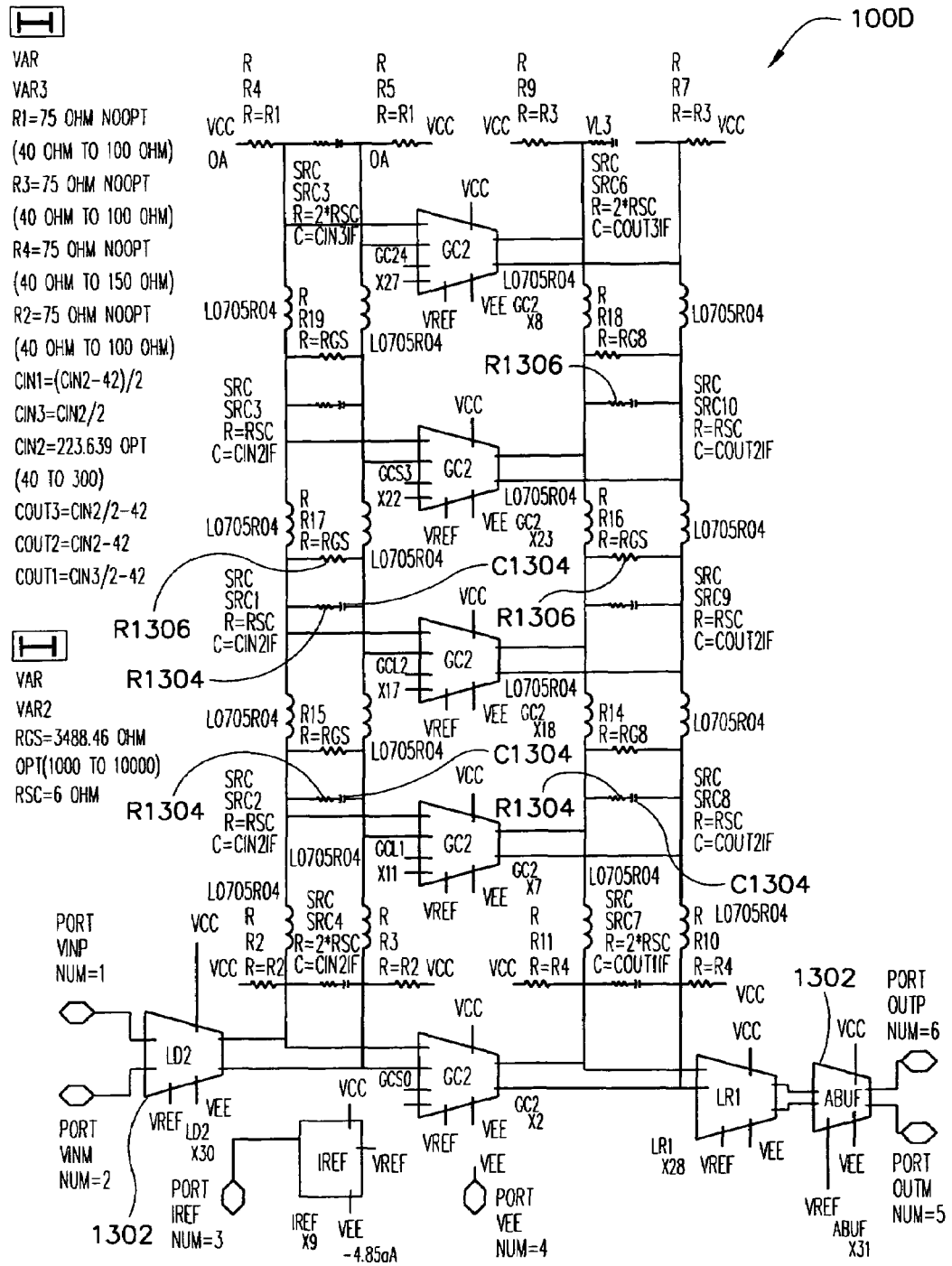
FIG. 13 is a circuit diagram of 5-tap tapped-delay line filter with artificial transmission lines according to one exemplary embodiment of the present invention.

Referring now to FIG. 13, the design for an exemplary 5-tap $\tau=T_0/5$ short-time tapped-delay line filter 100D that is based on artificial transmission lines is illustrated. For this filter 100D, it was found that only one LC pair was required for each tap ($2^{nd}$ order low-pass filter). Each delay element can provide 37 (pico-seconds) ps of delay (½ of ⅕ period at 2.7 Gbps). The inductors used were integrated spiral inductors with a nominal inductance of 2.7 nH. The actual loading capacitor values were initially selected as indicated above, but optimized for the best frequency response in the actual design. A series resistance R1304 was added to the loading capacitors C1304 to lower the phase peaking at the stopband edge. An additional shunt resistance R1306 was added to help counteract the effect of the inductor loss Inductor loss makes the delay lines characteristic resistance complex. The addition of an appropriate shunt resistance can cancel this effect and make the characteristic impedance real at a target frequency. The input and output of the filter 100D are buffered by amplifiers 1302 to isolate the circuit from external influences.

Figure 14:
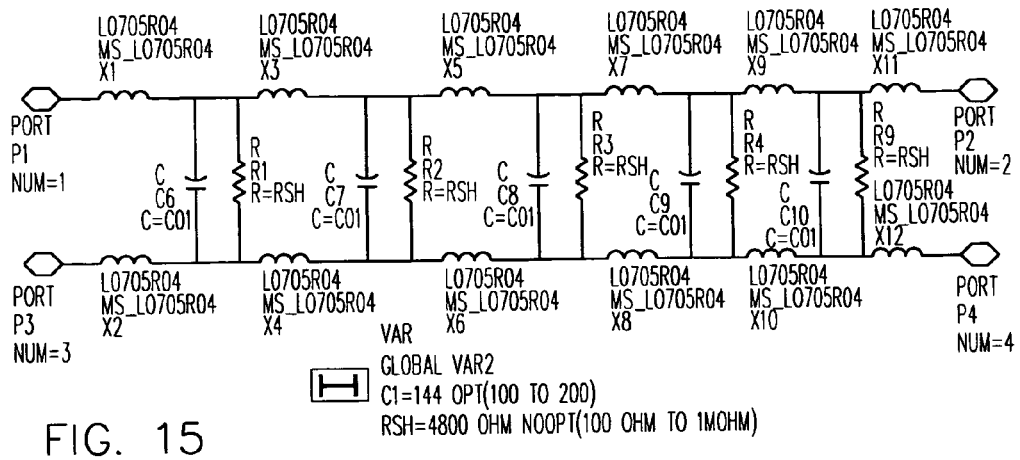
FIG. 14 is a circuit diagram of an exemplary long-time delay artificial transmission line according to one exemplary embodiment of the present invention.
Figure 15:
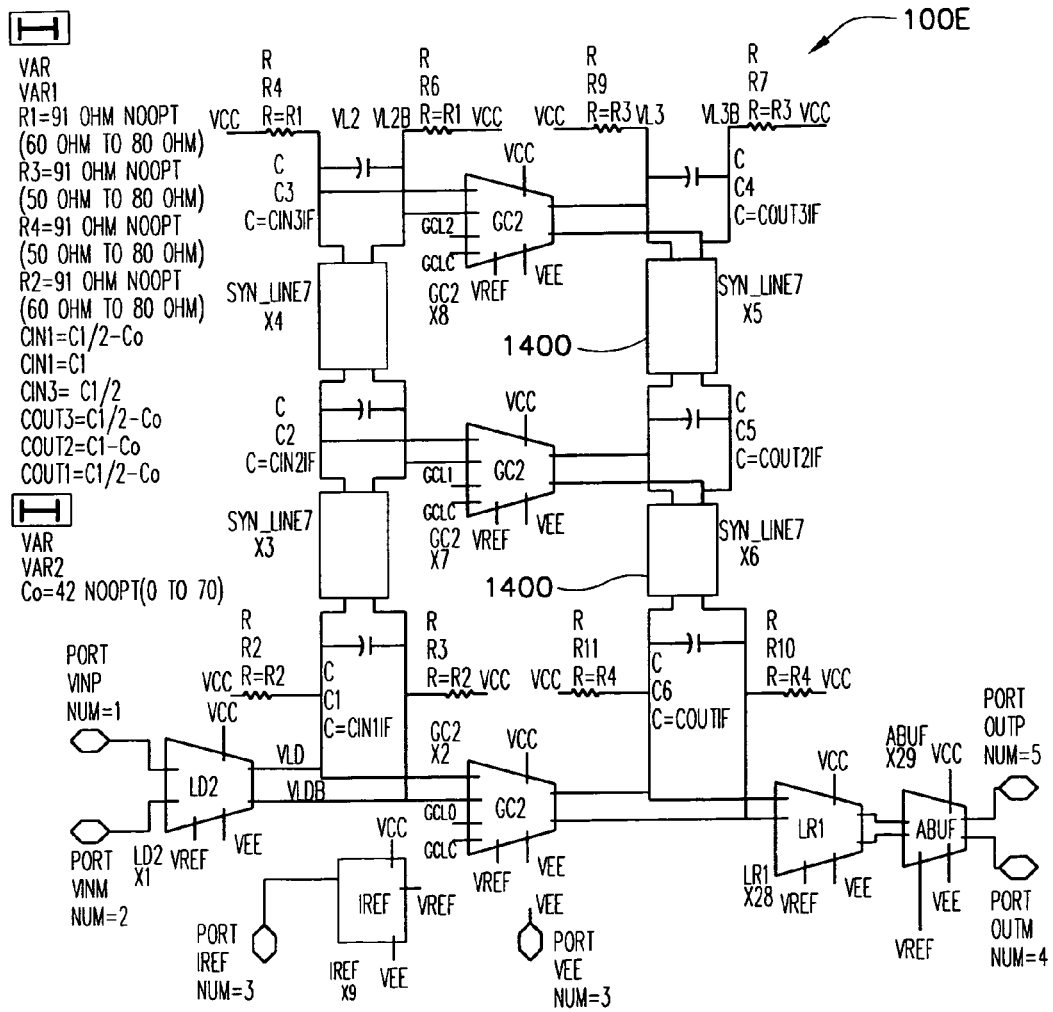
FIG. 15 is a circuit diagram of an exemplary three-tap tapped-delay line filter according to one exemplary embodiment of the present invention.

For the long-time filter 115 (3-tap $\tau=T_0$), a six stage LC filter was required to obtain the necessary delay of 185 ps. Referring now to FIG. 14, this figure illustrates an exemplary circuit of an individual long delay element 1400. Four of these long delay elements 1400 were used in the exemplary filter embodiment 100E illustrated in FIG. 15. The exemplary filter embodiment 100E of FIG. 15 can be referred to as a 3-tap long-time tapped-delay line filter.

Coefficient Adaptation Algorithm

The gains of the filter tap amplifiers g are adjusted to maximize a signal fidelity measure q(t) (provided by the SIU 125 for example). The general idea is to slightly perturb the coefficients and observe the effect on q(t). Doing this allows a set of coefficient values to be determined that locally maximizes the signal fidelity. The approach continually perturbs the coefficients to survey the signal fidelity's dependence on the coefficients and tune the SCF 100 to the optimal values in an adaptive fashion. The method is presented for the case of the short-time filter, but the approach is equally applicable to the long-time filter. Alternatively, the cascade of the two filters can be viewed as a single filter whose coefficients are adapted by the following method as will be discussed below.

The intuition in the preceding paragraph can be made precise by restating it as the following optimization problem $$\alpha^* = \arg\max_\alpha \{q(t)\} \qquad (10)$$

where α denotes the vector of adjustable filter coefficients and q(t) quantifies the fidelity of the signal (such as a measure of the signal's Q-factor as produced by the SIU[4]). Eq. (10) is solved via an empirical minimization of q(t). Towards this end, a coordinate descent algorithm can be used to find the local maximum by searching over each coordinate while the others are held fixed (i.e. perturbing one of the filter coefficients $\alpha_0, \alpha_1, \ldots, \alpha_N$ at a time). One skilled in the art will realize that other numerical optimization techniques (such as gradient, Newton, and conjugate methods) may also be used to solve Eq. (10).

In some contexts, simply maximizing the signal fidelity may not be sufficient to provide good SCF performance. In particular, there is the possibility of a null-space of solutions. For example, consider the task of short-time equalization when there is no ringing and noise on the received signal to compensate. An intuitive solution would be to have $\alpha_0=1$ and $\alpha_n=0$ for all other n, i.e. perform no filtering. However, an equally valid solution would be, $\alpha_0=1$, $\alpha_1=A$, $\alpha_2=-A$, and $\alpha_n=0$ for all other n where A can be any value (including arbitrarily large values). Other convoluted (but still valid) sets of coefficients can also be obtained. The drawbacks of such non-intuitive solutions are 1. They obscure the identifiability of the coefficients which are actually helping to improve signal fidelity. For instance, in the above example, $\alpha_1$ and $\alpha_2$ effectively cancel each other and do nothing to reduce ringing or noise.
2. They reduce the robustness of the system to changes in the channel characteristics. In particular, if the channel characteristics change such that the null-space "moves" (e.g. a little ringing is introduced), then $\alpha_1$ and $\alpha_2$ will no longer cancel each other and a very erratic signal will result until the coefficients are relearned to remove such artifacts.

Motivated by such problems, there may be the desire to guide the values of the filter coefficients $\alpha_n$, in addition to maximizing the signal fidelity. To achieve such a result, a regularization penalty can be imposed in the objective function. For example, solving the following optimization problem could be chosen in place of Eq. (10):

$$\alpha^* = \arg\max_{\alpha}\{q(t)^2 - \gamma\|\alpha - \beta\|_2^2\} \quad (11)$$

where γ and β are regularization parameters. The parameter β is a nominal value for α Specifically, β is the value one would expect α* to be in the absence of any channel distortion. While β represents the nominal value of α*, γ represents confidence in β and determines how strongly α* is driven towards β. Note that if no biasing is desired, then γ should be set to zero, and Eq. (11) reduces to Eq. (10). Thus, Eq. (10) can be seen as a specific case of Eq. (11). One skilled in the art will realize that a variety of penalty functions can be used in place of the 2-norm in Eq. (11).

As previously stated, the long-time filter coefficients can similarly be adapted according to Eq. (11), i.e. it can be chosen that $$a^* = \arg\max_{a}\{q(t)^2 - \gamma\|a - b\|_2^2\} \quad (12)$$

where b is the nominal value for the long-time filter coefficients. The nominal situation again corresponds to when the channel introduces no signal distortion. For example, if one generally believes the channel introduces no ISI, then b should generally resemble a Euclidean basis vector, i.e. a vector with a single 1 and the rest zeros. That is, the nominal long-time filter should not do much filtering.

Automatic Gain Control

Thus far, the special case of no DC amplification on the filtered multilevel signal has been considered. A non-unity gain could be selected. And if a variable gain amplifier (VGA) module 105 is to lead or follow the SCF 100, then the control of the VGA module 105 may be incorporated into the SCF's 100 control. In particular, if the desired gain $A_{VGA}$ can be obtained as an external signal (perhaps determined in the SIU 125, then the SCP 100 can control the gain by simply scaling all of the coefficients $\alpha_n$ (or $a_n$) by $A_{VGA}$. This is simply a mathematical operation that can be performed after the calculation of filter coefficients in Eq. (11) or (12). Alternately, the gain control of the VGA module 105 can be adjusted as needed by the SIU.

Simulation Results

To demonstrate results of the proposed filtering method, the inventors completed a MATLAB simulation as applied to real data of a 4-PAM signal in an optical communications system.

Figure 16:
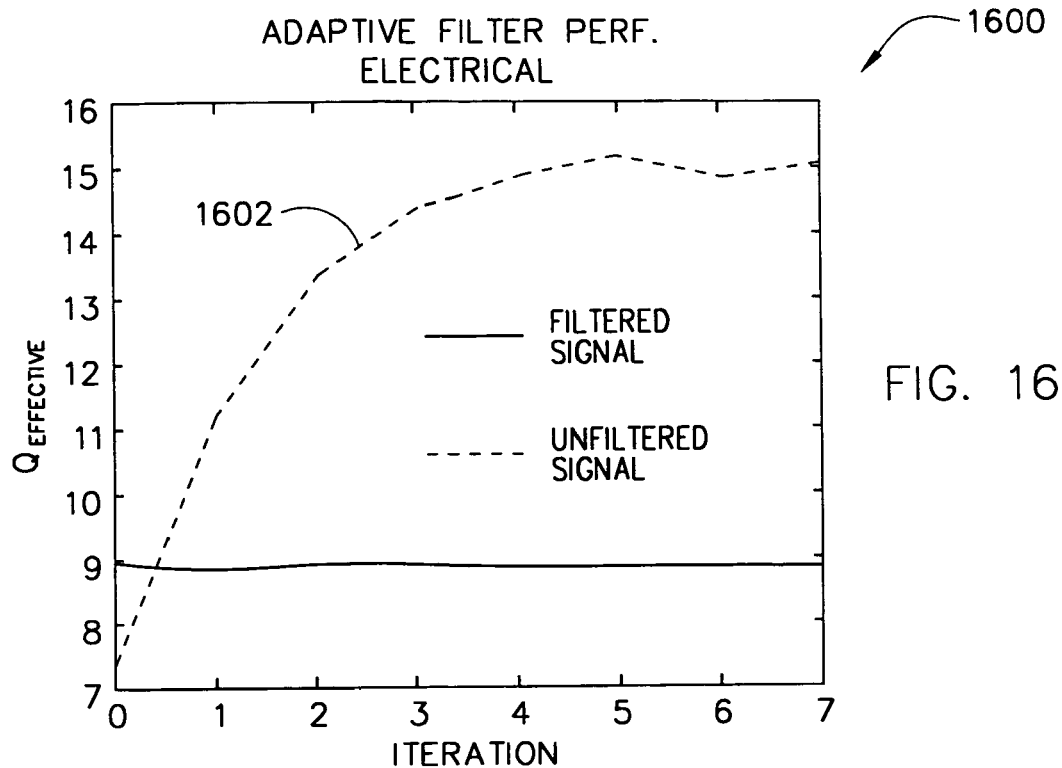
FIG. 16 is a graph that illustrates how the effective Q-factor varies with the initial iterations of the adaptive filter for an electrical multilevel signal according to one exemplary embodiment of the present invention.
Figure 18:
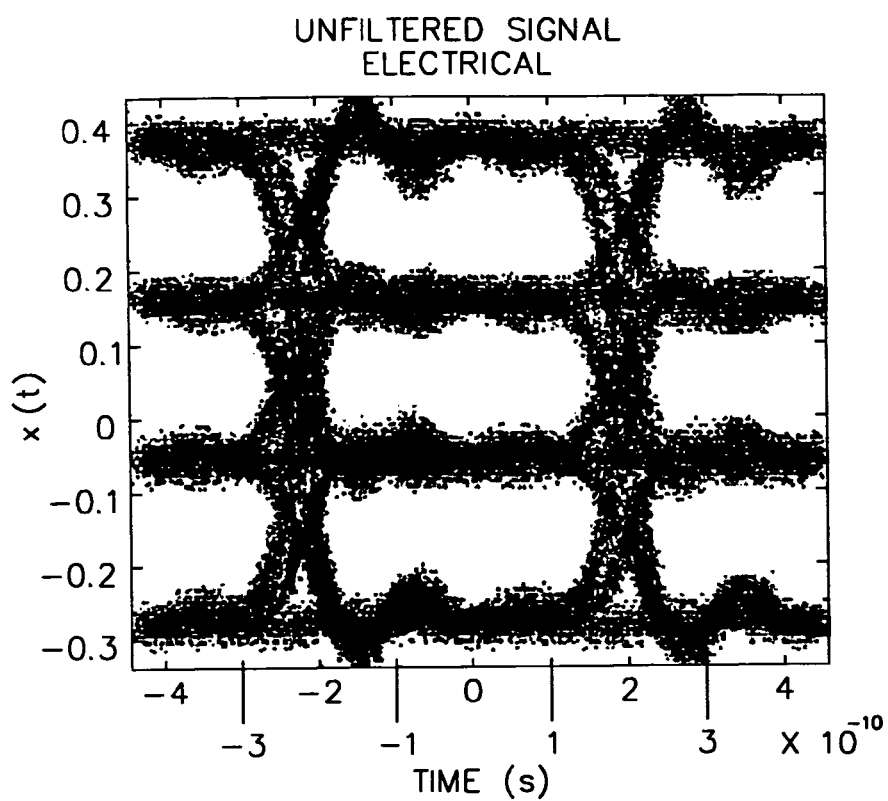
FIG. 18 is a graph of an Eye-diagram for an unfiltered multilevel electrical drive signal that can be used as an input to the present invention.
Figure 19:
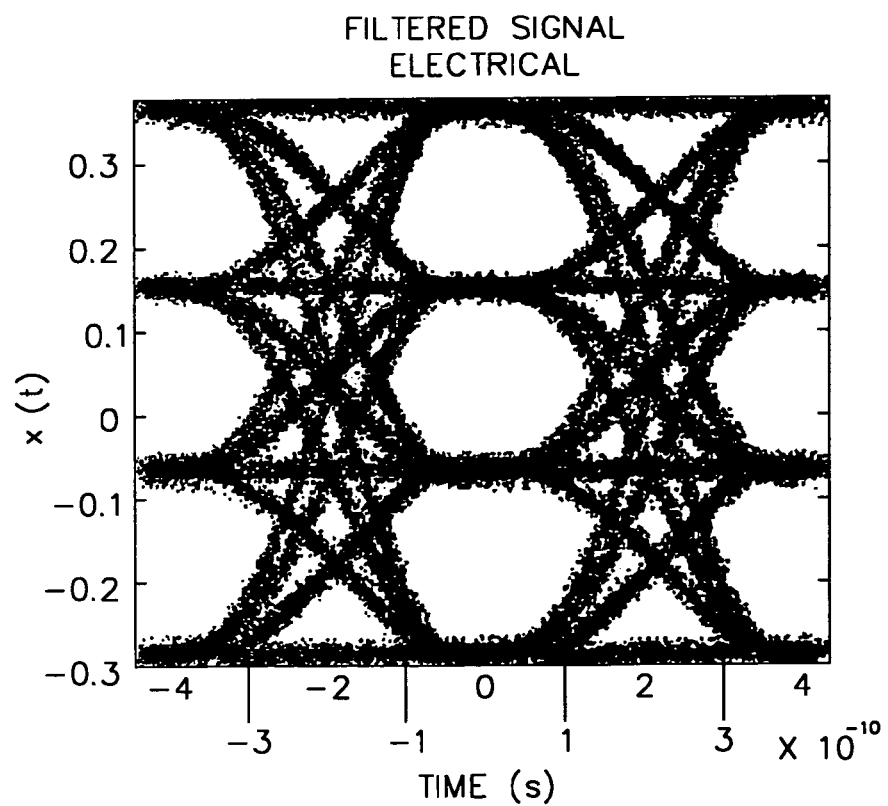
FIG. 19 is a graph of an Eye-diagram for a filtered multilevel electrical drive signal according to one exemplary embodiment of the present invention.

First, a system dominated by short-time effects, i.e. ringing and noise, is examined. Specifically, an electrical drive signal and a received signal after 100 km of fiber is considered. The progression of the fidelity measure as the filter adaptation algorithm iterates is shown in FIGS. 16 (for the electrical drive signal) and 17 (for the received optical signal). Specifically, the graph 1600 in FIG. 16 conveys the value of the signal fidelity measure as the filter coefficients are being adjusted. From the plot 1602, it can be seen that the fidelity of the signal is improved as the coefficients are adjusted. The numerical improvement conveyed by plot 1602 can be further appreciated by considering the eye-diagrams in FIGS. 18 and 19. FIG. 18 shows the eye diagram for the signal before any filtering, i.e. at iteration 0 in graph 1600. FIG. 19 shows the eye-diagram of the signal after filtering on iteration 7 in graph 1600. Clearly, the amount of ringing on the signal has been reduced through the use of filtering providing a better quality signal.

Figure 17:
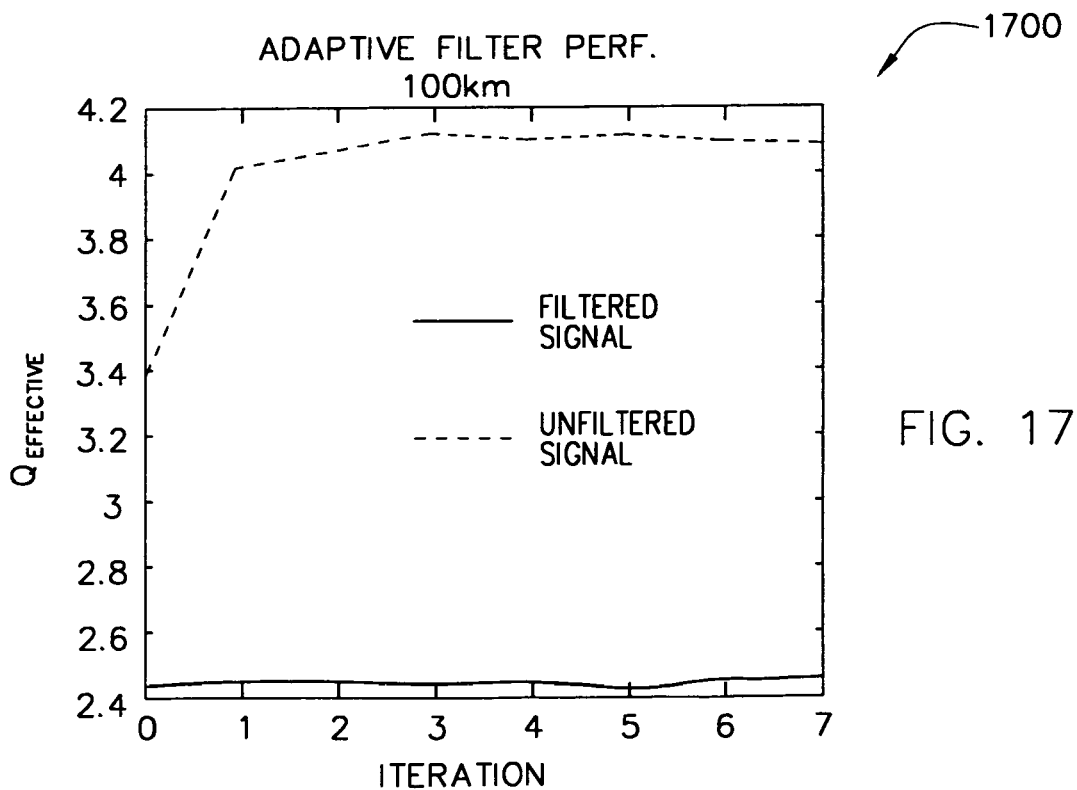
FIG. 17 is a graph that illustrates how the effective Q-factor varies with the initial iterations of the adaptive filter for a multilevel signal going through 100 km of fiber according to one exemplary embodiment of the present invention.
Figure 20:
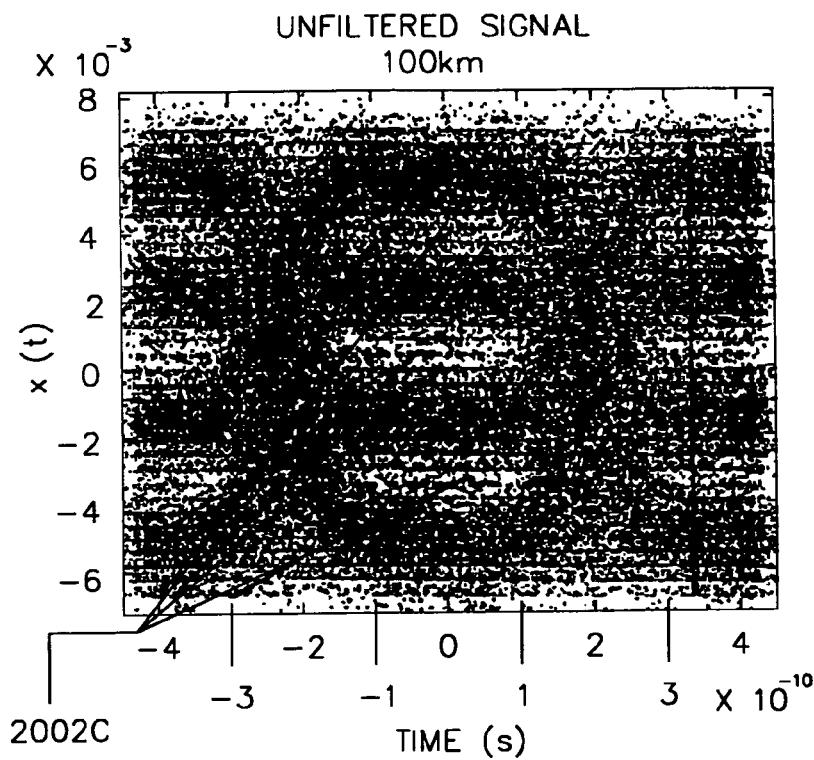
FIG. 20 is a graph of an Eye-diagram for an unfiltered multilevel optical signal that can be used as an input to the present invention.
Figure 21:
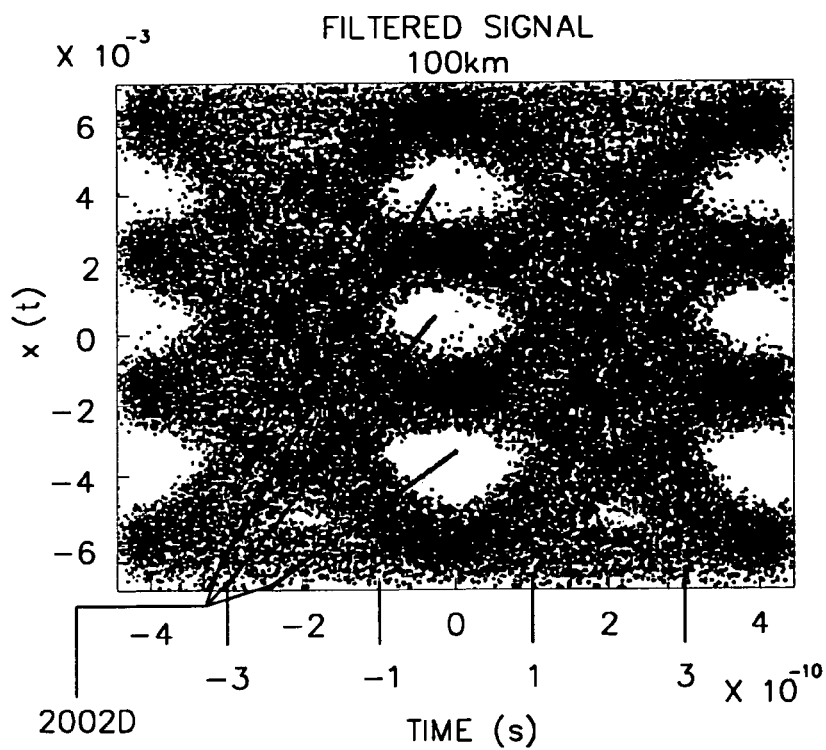
FIG. 21 is a graph of an Eye-diagram for a filtered multilevel optical signal according to one exemplary embodiment of the present invention.

FIG. 17 is analogous to FIG. 16, except that FIG. 17 is for a photodetected optical signal after 100 km of optical fiber. Specifically, graph 1700 in FIG. 17 shows the progression of the fidelity measure as the filter coefficients are adjusted in each iteration for this optical system. FIGS. 20 and 21 are analogous to FIGS. 18 and 19. In particular, FIG. 20 shows an eye-diagram of the photodetected optical signal before any filtering. Clearly, the signal is of poor quality as exhibited by the nearly closed eye-openings 2002C. FIG. 21, however, shows very wide eye-openings 2002D that are produced after filtering the signal with the described invention.

Figure 22:
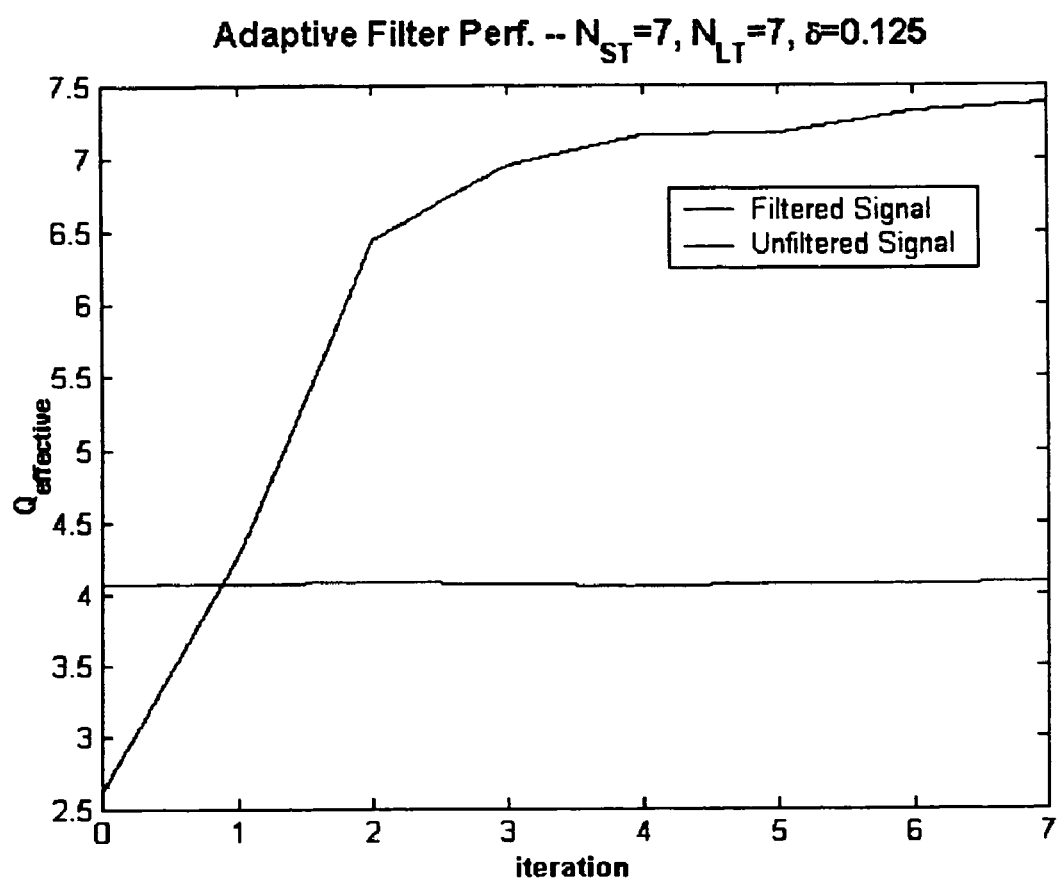
FIG. 22 is a graph illustrating how the effective Q-factor varies with the initial iterations of the adaptive filter for a multilevel signal with inter-symbol interference according to one exemplary embodiment of the present invention.
Figure 23:
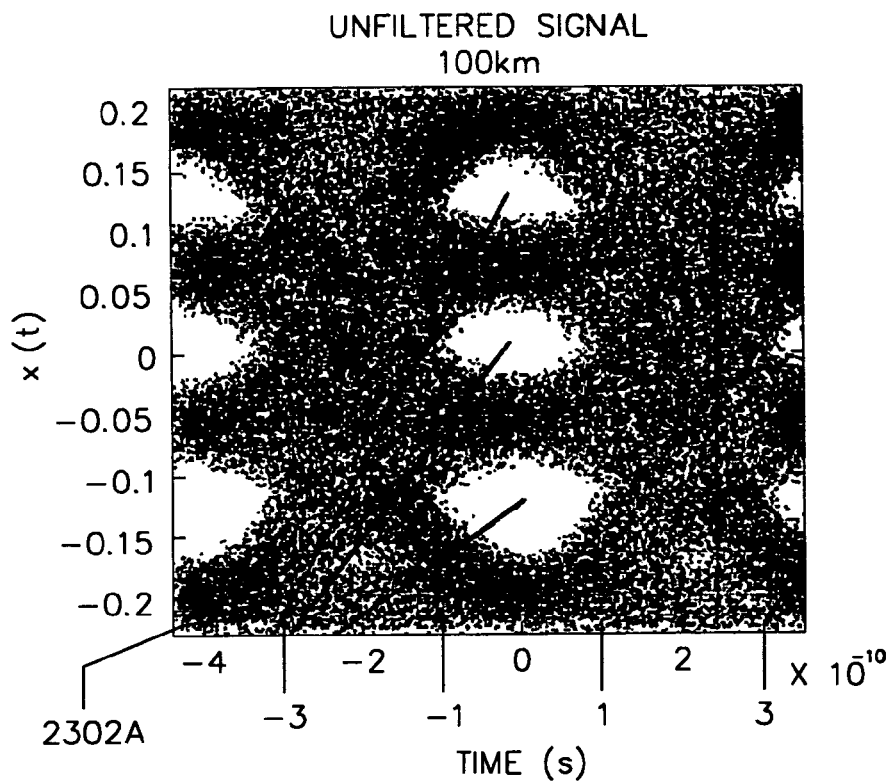
FIG. 23 is a graph of an Eye-diagram for an unfiltered multilevel optical signal that can be used as an input to the present invention.

In addition to the short-time distortion noise dominated data sets in FIGS. 16 through 22, another data set in which the signal is predominantly degraded by ISI is examined. Again, the context is an optical system with 100 km of fiber, but contrary to the system used for FIGS. 8, 11, and 12, a different photodetector is used which is less vulnerable to noise, thus leaving ISI as the dominant source of signal degradation. The evolution of the signal fidelity is shown in FIG. 22 from which we see a significant improvement in signal quality (almost doubling the fidelity measure). The eye-diagrams associated with the SCF are shown in FIGS. 23 (without filtering) and 24 (with filtering). The increase in the eye-opening from before filtering 2302A to after filtering 2302B clearly conveys the improvement in signal quality afforded by the SCF.

Laboratory Results

An exemplary IC implements the filter embodiment discussed above, as illustrated by the circuit 2500 of FIG. 25. The circuit 2500 was fabricated in a GaAs HBT process. The short-time filter 2505 comprises five coefficient amplifiers 2510 and eight delay elements 2515 to realize the 5-tap tapped-delay line filter illustrated in FIG. 22. As previously described, a pair of $\tau/2$ delay elements 2515 are used to produce the desired delay of $\tau$ ($\tau/2$ from the input side and $\tau/2$ from the output side).

Figure 24:
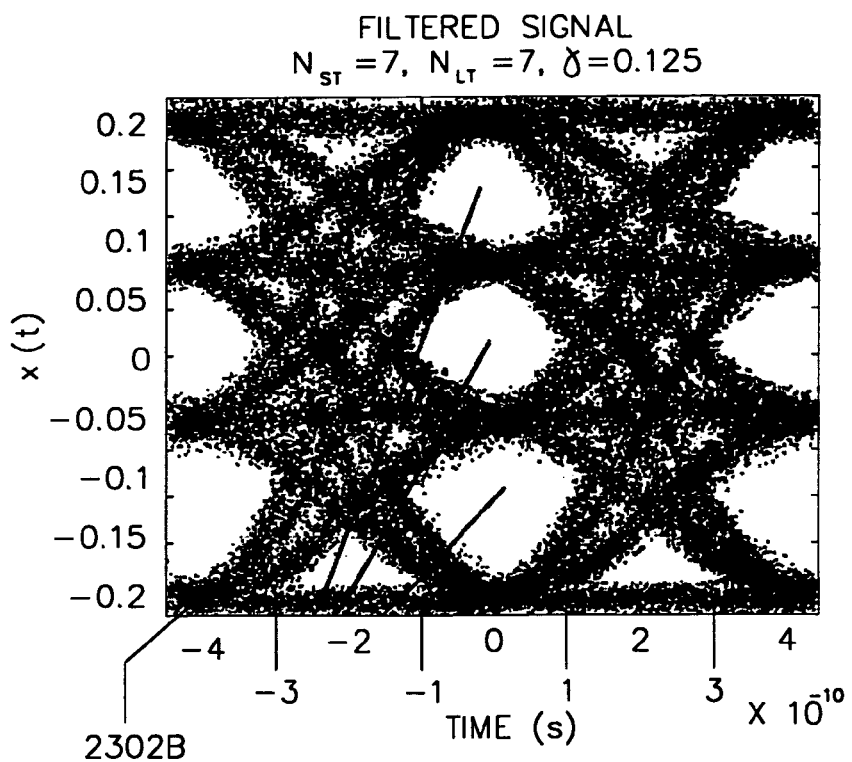
FIG. 24 is a graph of an Eye-diagram for a filtered multilevel optical signal -according to one exemplary embodiment of the present invention.

Meanwhile, the long-time filter 2520 comprises three coefficient amplifiers 2510 and four delay elements 2525 to realize the 3-tap long-time filter illustrated in FIG. 24. Coefficient amplifiers 2510 are Gilbert cell multipliers with identical topologies, although specific circuit parameters may vary as each multiplier is optimized according to the surrounding circuit.

Figure 25:
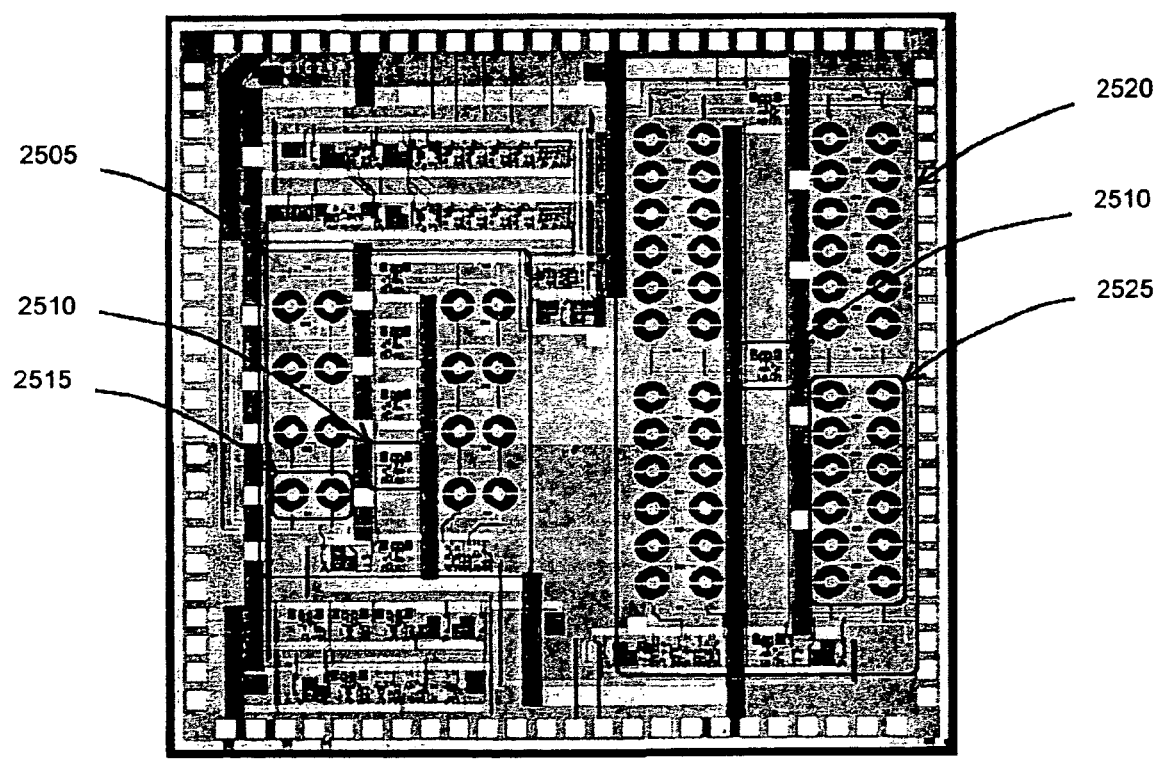
FIG. 25 illustrates a signal conditioning filter (SCF) fabricated in GaAs as an integrated circuit that contains a variable gain input amplifier and a transit detector circuit for clock recovery according to one exemplary embodiment of the present invention.
Figure 26:
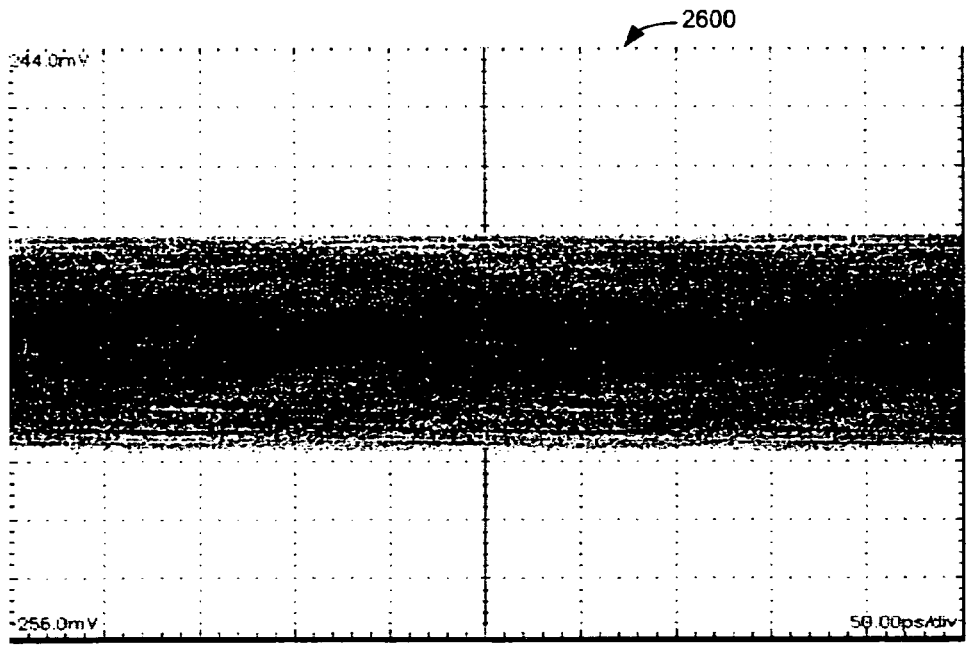
FIG. 26 is a graph that illustrates a 5 Gbps unfiltered binary signal after transmission over 34" of copper trace in a backplane that can used as input to the present invention.
Figure 27:
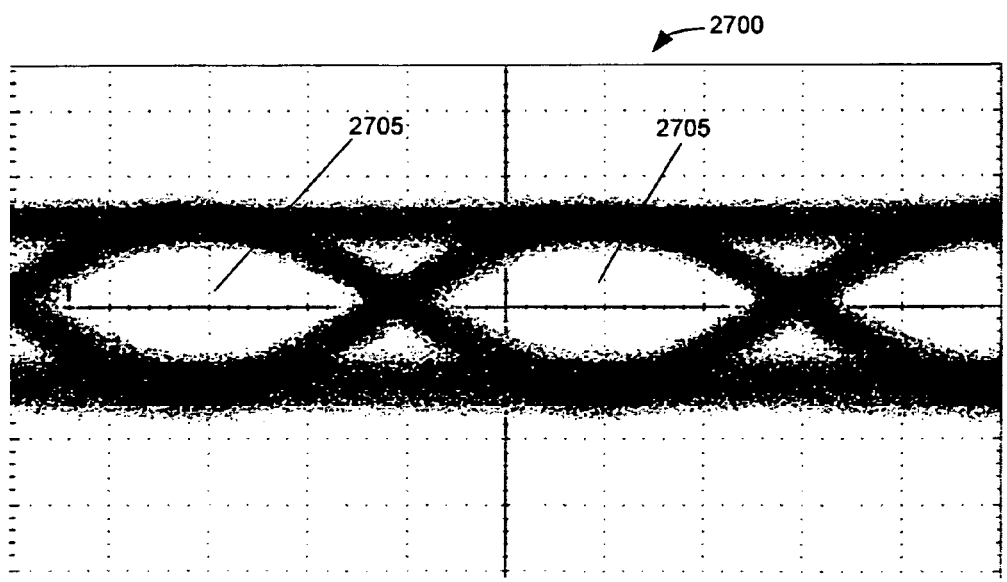
FIG. 27 is a graph that illustrates the signal of FIG. 26 after equalization with the signal conditioning filter according to one exemplary embodiment of the present invention.

The improved output provided by the SCF circuit 2500 of FIG. 25 is illustrated by FIGS. 26 and 27. FIG. 26 illustrates a received signal from a backplane communications system transmitting a binary signal at a data rate of 5 Gbps over a 34" copper trace. Specifically, FIG. 26 illustrates the condition of the received electrical binary signal in the form of an eye-diagram 2600. Clearly, no reliable data can be recovered from this received signal as there is no eye-opening.

Meanwhile, referring now to FIG. 27, this figure shows an eye-diagram 2700 for the same received signal illustrated in FIG. 26 but being processed by the SCF 100 and its corresponding control method. The eye-openings 2705 are now clearly visible affording reliable communications which was unachievable without equalization.

Figure 28:
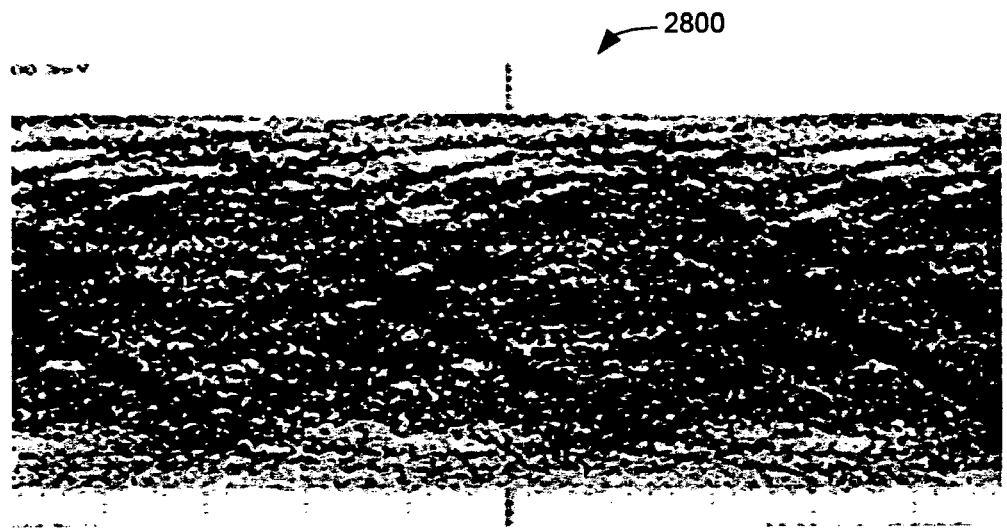
FIG. 28 is a graph that illustrates an unfiltered 10 Gbps (4-level 5 G sym/s) signal after transmission over 150 m of multimode fiber that can be used as input to the present invention.
Figure 29:
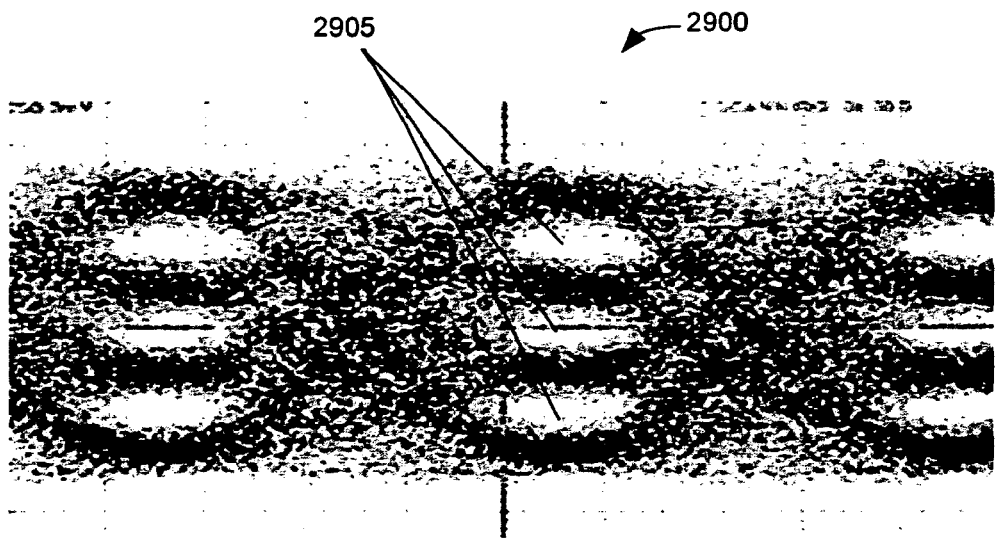
FIG. 29 is a graph that illustrates the multilevel signal of FIG. 28 after equalization with the signal conditioning filter according to one exemplary embodiment of the present invention.

Referring now to FIGS. 28 and 29, these figures demonstrate the improvement provided by the SCF 100 in an optical communications system. The system channel now includes optical components. Specifically, the electrical data signal is converted to an optical signal with a VCSEL (vertical cavity surface emitting laser), transmitted over 150 m of multimode fiber (MMF), and converted back to an electrical signal at the receiver with a photodetector.

FIG. 28 illustrates an eye diagram 2800 where the condition of the received electrical signal when a 4-level 5 Gsym/s (yielding a 10 Gbps data rate) is transmitted. Again, there are no visible eye-openings in the received signal and thus data cannot be reliably recovered.

Meanwhile, in FIG. 29, an eye-diagram 2900 for the same received signal is illustrated but after filtering with the SCF 100 of one exemplary embodiment of the present invention. The four signal levels are now apparent from the eye-openings 2905 which means that data can be recovered from this received and filtered signal.

Therefore, the present invention provides an adaptive filtering approach that combines channel equalization and noise filtering. The method and system of the present invention can easily support high speed digital communications which combines channel equalization and noise filtering in a single framework. The method and system of the present invention can account for the effects that equalization can have on noise filtering, and vice-versa. Furthermore, the method and system are adaptive in nature and have a practical means of implementation for high-speed data communications systems.

It should be understood that the foregoing relates only to illustrate the embodiments of the present invention, and that numerous changes may be made therein without departing from the scope and spirit of the invention as defined by the following claims.

What is claimed is:

1. A system for processing digital signals comprising symbols propagated according to a period, the system comprising:
   a signal conditioning filter comprising:
      a first stage for mitigating degradations of the digital signals that occur according to a first time scale, the first stage comprising a first analog filter tuned to the first time scale, the first time scale comprising a fraction of the period at which the symbols are propagated, and
      a second stage for removing signal distortions that occur according to a second time scale, the second stage comprising a second analog filter tuned to the second time scale, the second time scale being different than the first time scale and comprising a magnitude at least equal to the period at which the symbols are propagated; and
   a signal integrity unit coupled to an output of the second stage, the signal integrity unit comprising a third analog filter stage for producing an analog probability estimate, the signal integrity unit analyzing the analog probability estimate and adjusting the first and second time scales based on the analysis of the analog probability estimate.

2. The system of claim 1, wherein each analog filter comprises a linear tapped-delay line filter.

3. The system of claim 2, wherein each linear tapped delay-line filter comprises LC circuits.

4. The system of claim 1, wherein the signal integrity unit controls the signal conditioning filter by maximizing fidelity of the digital signals.

5. The system of claim 1, wherein the signal conditioning filter comprises a coefficient amplifier, the coefficient amplifier comprising a Gilbert cell multiplier.

6. A system for processing digital signals comprising symbols propagated according to a symbol period, the system comprising:
   a first analog filter stage comprising a first filter tuned to a first time constant, the first time constant comprising a value that is less than the symbol period, for compensating for signal distortions that occur within a single symbol period and for integrating over less than a symbol period;
   a second analog filter stage comprising a second filter tuned to a second time constant, the first time constant being smaller than the second time constant and the second time constant comprising value at least equal to the symbol period; and
   a signal integrity unit coupled to an output of the second analog filter stage, the signal integrity unit comprising a third analog filter stage for producing an analog probability estimate, the signal integrity unit analyzing the analog probability estimate and adjusting the first and second time constants based on the analysis of the analog probability estimate.

7. The system of claim 6, wherein each filter comprises linear tapped-delay line filter.

8. The system of claim 6, wherein each filter comprises a coefficient amplifier, the coefficient amplifier comprising a Gilbert cell multiplier.

9. The system of claim 6, wherein the first filter stage substantially reduces at least one of ringing, jitter, and noise.

10. The system of claim 6, wherein the second filter stage removes inter-symbol interference (ISI).

* * * * *